(12) United States Patent
Ohnishi et al.

(10) Patent No.: US 12,278,408 B2
(45) Date of Patent: Apr. 15, 2025

(54) ELECTROCHEMICAL ELEMENT, ELECTROCHEMICAL MODULE, ELECTROCHEMICAL DEVICE, AND ENERGY SYSTEM

(71) Applicant: Osaka Gas Co., Ltd., Osaka (JP)

(72) Inventors: Hisao Ohnishi, Osaka (JP); Mitsuaki Echigo, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 1233 days.

(21) Appl. No.: 17/043,816

(22) PCT Filed: Mar. 29, 2019

(86) PCT No.: PCT/JP2019/014381
§ 371 (c)(1),
(2) Date: Dec. 28, 2020

(87) PCT Pub. No.: WO2019/189916
PCT Pub. Date: Oct. 3, 2019

(65) Prior Publication Data
US 2021/0119235 A1    Apr. 22, 2021

(30) Foreign Application Priority Data

Mar. 30, 2018 (JP) ................................. 2018-070345

(51) Int. Cl.
*H01M 8/0258* (2016.01)
*H01M 8/0245* (2016.01)
(Continued)

(52) U.S. Cl.
CPC ....... *H01M 8/0618* (2013.01); *H01M 8/0245* (2013.01); *H01M 8/0254* (2013.01);
(Continued)

(58) Field of Classification Search
CPC ............ H01M 8/0618; H01M 8/0245; H01M 8/0254; H01M 8/0258; H01M 8/04014;
(Continued)

(56) References Cited

U.S. PATENT DOCUMENTS 5,554,454 A     9/1996  Gardner et al.
6,492,050 B1 *  12/2002 Sammes ............. H01M 8/2485
                                                          429/458
(Continued)

FOREIGN PATENT DOCUMENTS

CA    3017847 A1    9/2017
JP    8255617 A    10/1996
(Continued)

*Primary Examiner* — Cynthia K Walls
(74) *Attorney, Agent, or Firm* — The Webb Law Firm

(57) ABSTRACT

An electrochemical element including a conductive plate-like support provided with an internal passage therein. The plate-like support includes, in at least a portion of a metal support included in the plate-like support: a gas-permeable portion through which gas is permeable between the internal passage, which is located inside the plate-like support, and the outside; and an electrochemical reaction portion that entirely or partially covers the gas-permeable portion and includes at least a film-like electrode layer, a film-like electrolyte layer, and a film-like counter electrode layer in the stated order. The plate-like support is provided with a plurality of passages in the internal passage.

19 Claims, 13 Drawing Sheets

(51) Int. Cl.
  *H01M 8/0254* (2016.01)
  *H01M 8/04014* (2016.01)
  *H01M 8/04858* (2016.01)
  *H01M 8/0612* (2016.01)
  *H01M 8/1226* (2016.01)
  *H01M 8/2432* (2016.01)
  *H01M 8/2484* (2016.01)
  *H01M 8/12* (2016.01)

(52) U.S. Cl.
  CPC ..... *H01M 8/0258* (2013.01); *H01M 8/04014* (2013.01); *H01M 8/04925* (2013.01); *H01M 8/1226* (2013.01); *H01M 8/2432* (2016.02); *H01M 8/2484* (2016.02); *H01M 2008/1293* (2013.01)

(58) Field of Classification Search
  CPC ........... H01M 8/04925; H01M 8/1226; H01M 8/2432; H01M 8/2484; H01M 2008/1293; H01M 8/04932; H01M 8/0494; H01M 8/04007; H01M 8/2425; Y02P 20/129; Y02E 60/50
  See application file for complete search history.

(56) References Cited

U.S. PATENT DOCUMENTS 6,492,053 B1* 12/2002 Donelson ............ H01M 8/0247
  429/513
2007/0207375 A1  9/2007 Jacobson et al.
2015/0311559 A1 10/2015 Tsukamoto et al.

FOREIGN PATENT DOCUMENTS

| | | |
|---|---|---|
| JP | 2015207509 A | 11/2015 |
| JP | 2016195029 A | 11/2016 |
| JP | 2017041404 A | 2/2017 |
| JP | 2017174605 A | 9/2017 |
| JP | 2017183177 A | 10/2017 |

* cited by examiner

ELECTROCHEMICAL ELEMENT, ELECTROCHEMICAL MODULE, ELECTROCHEMICAL DEVICE, AND ENERGY SYSTEM

CROSS-REFERENCE TO RELATED APPLICATIONS

This application is the United States national phase of International Application No. PCT/JP2019/014381 filed Mar. 29, 2019, and claims priority to Japanese Patent Application No. 2018-070345 filed Mar. 30, 2018, the disclosures of which are hereby incorporated by reference in their entirety.

BACKGROUND OF THE INVENTION

Field of the Invention

The present invention relates to an electrochemical element, an electrochemical module, an electrochemical device, and an energy system.

Description of Related Art

JP 2016-195029A (Patent Document 1) discloses an electrochemical element including an elongated tubular support provided with an internal space, and an electrochemical reaction portion that is provided on one face of the tubular support so as to extend in the longitudinal direction and generates power. One end portion of the tubular support in the longitudinal direction is connected to a gas manifold in which reformed gas containing hydrogen flows, and the reformed gas flows in the internal space of the tubular support. The reformed gas flows in the internal space of the tubular support from one end portion toward the other end portion in the longitudinal direction. The tubular support is provided with through holes through which the internal space and the electrochemical reaction portion are in communication with each other. Accordingly, the reformed gas flows from the internal space of the tubular support to the electrochemical reaction portion via the through holes. In the electrochemical reaction portion, an electrode layer, an electrolyte layer, and a counter electrode layer are stacked in the stated order from a side that faces the tubular support, and the reformed gas flows into the electrode layer. On the other hand, air flows from a blower into the counter electrode layer. Accordingly, in the electrochemical reaction portion, power is generated through an electrochemical reaction between the reformed gas and the air.

In such an electrochemical element disclosed in Patent Document 1, the tubular support supports the electrochemical reaction portion, thus making it possible to improve the mechanical strength of the entire electrochemical element.
Patent Document 1: JP 2016-195029A

SUMMARY OF THE INVENTION

However, although the reformed gas passes through the internal space of the tubular support from one end portion toward the other end portion in the longitudinal direction when the electrochemical element disclosed in Patent Document 1 is allowed to function as a power generating element that generates power through an electrochemical reaction in which the reformed gas is used as fuel, the flow rates of the reformed gas at positions in the short direction that is orthogonal to the longitudinal direction are not equal at multiple random positions in the longitudinal direction. For example, the flow rate of the reformed gas at the central portion of the internal space in the short direction is faster than those at two end portions in the short direction. Therefore, at the two end portions in the short direction where the flow rates of the reformed gas are slow, even when a sufficient amount of reformed gas flows into the electrode layer at one end portion in the longitudinal direction, the concentration of the reformed gas may decrease from one end portion toward the other end portion in the longitudinal direction, and thus the reformed gas flowing into the electrode layer may become insufficient at the other end portion in the longitudinal direction. In this case, fuel may run short at a portion of the electrode layer on the other end side in the longitudinal direction, and the electrode layer may deteriorate due to oxidation, leading to impairment of the electrode performance and the mechanical strength.

On the other hand, at the central portion in the short direction, the concentration of the reformed gas decreases from one end portion toward the other end portion in the longitudinal direction, but the flow rate of the reformed gas is faster than those at the two end portions in the short direction, and the flow amount of the reformed gas per unit time is larger. Thus, unreacted reformed gas that is not used in the electrode layer is discharged from the other end portion in the longitudinal direction.

Accordingly, to suppress deterioration of the two end portions of the electrode layer in the short direction due to oxidation, it is conceivable that the electrochemical reaction is suppressed such that the reformed gas can flow to the other end portion in the longitudinal direction. In this case, the electrochemical reaction is suppressed at not only the two end portions but also the central portion in the short direction, the amount of unreacted reformed gas that is not used in the electrode layer and is discharged from the other end portions in the longitudinal direction increases. Accordingly, deterioration of the electrode layer due to oxidation can be suppressed, but the fuel usage rate decreases, and thus the reaction efficiency of the electrochemical reaction in the electrochemical element decreases.

Accordingly, the present invention was achieved in light of the aforementioned problems, and an object thereof is to provide an electrochemical element, an electrochemical module, an electrochemical device, and an energy system that can improve the efficiency of converting chemical energy such as fuel into electric energy or can improve the efficiency of converting electric energy into chemical energy such as fuel.

A characteristic configuration of an electrochemical element according to the present invention includes
  conductive plate-like support provided with an internal passage therein,
  wherein the plate-like support includes, in at least a portion of the plate-like support: a gas-permeable portion through which gas is permeable between the internal passage, which is located inside the plate-like support, and the outside; and an electrochemical reaction portion that entirely or partially covers the gas-permeable portion and includes at least a film-like electrode layer, a film-like electrolyte layer, and a film-like counter electrode layer in the stated order, and
  the plate-like support is provided with a plurality of passages in the internal passage.

With this characteristic configuration, the plate-like support is provided with the plurality of passages inside the internal passage. Accordingly, gas flows into the plurality of passages in the internal passage, and thus flows separately along the plurality of passages. The flow rates of the gas at multiple random positions in a flow-intersection direction that intersects the gas flowing direction are made substantially equal by a flow straightening effect due to the gas flowing separately along the plurality of passages as described above compared with the case where the gas flows in an internal passage that is not provided with a plurality of passages. That is, the gas flow rates are substantially equal at multiple random positions including the central portion and the two end portions in the flow-intersection direction. Thus, the amounts of gas that flows into the electrochemical reaction portion can be made substantially equal at multiple random positions including the central portion and the two end portions in the flow-intersection direction. Accordingly, in the electrochemical reaction portion, a difference between a portion that is deficient in gas and a portion in which an excessive amount of gas flows can be reduced, and an electrochemical reaction can be caused to occur in the overall electrochemical element, thus making it possible to improve the reaction efficiency in the electrochemical element.

In another characteristic configuration of the electrochemical element according to the present invention, the plate-like support includes a first plate-like body, and at least a second plate-like body that forms the plurality of passages in the internal passage.

With this characteristic configuration, the plurality of passages can be easily formed, for example, by combining the first plate-like body with at least the second plate-like body that forms the plurality of passages in the internal passage.

In another characteristic configuration of the electrochemical element according to the present invention, the plate-like support includes:

an internal passage formation member that forms the internal passage; and a multiple-passage formation member that is housed in the internal passage and forms the plurality of passages.

With this characteristic configuration, the internal passage formation member forms the internal passage, and the multiple-passage formation member is housed in the internal passage. This multiple-passage formation member forms the plurality of passages in the internal passage. The flow rates of the gas flowing in the passages at multiple random positions in the flow-intersection direction are made substantially equal by a flow straightening effect due to the gas flowing along the plurality of passages. Accordingly, the amounts of gas that flows into the electrochemical reaction portion can be made substantially equal at multiple random positions including the central portion and the two end portions in the flow-intersection direction, thus making it possible to improve the reaction efficiency in the electrochemical element.

In another characteristic configuration of the electrochemical element according to the present invention, at least a portion of the plate-like support has a wavelike shape.

With this characteristic configuration, employing the configuration of the plate-like support in which at least a portion thereof has a wavelike shape makes it easy to form the plurality of passages.

In another characteristic configuration of the electrochemical element according to the present invention, at least a portion of the multiple-passage formation member has a wavelike shape.

With this characteristic configuration, employing the configuration of the multiple-passage formation member in which at least a portion thereof has a wavelike shape makes it easy to form the plurality of passages.

In another characteristic configuration of the electrochemical element according to the present invention, the plate-like support includes at least a first plate-like body and a second plate-like body, and contact portions where the first plate-like body is in contact with the second plate-like body and non-contact portions where the first plate-like body is not in contact with the second plate-like body form the plurality of passages in the internal passage.

With this characteristic configuration, the contact portions where the first plate-like body is in contact with the second plate-like body and the non-contact portions where the first plate-like body is not in contact with the second plate-like body form the plurality of passages in the internal passage. That is, at least some of the plurality of passages are in communication with each other due to the non-contact portions, and the gas flows separately along the plurality of passages while the gas can flow across the passages. Accordingly, the flow rates of the gas can be made substantially equal at multiple random positions including the central portion and the two end portions in the flow-intersection direction by a flow straightening effect due to the gas flowing along the plurality of passages.

In another characteristic configuration of the electrochemical element according to the present invention, the plate-like support is formed in a plate shape that extends in a longitudinal direction, and the plurality of passages extend in the longitudinal direction.

Due to the gas flowing the plurality of passages extending in the longitudinal direction, the lengths of the passages that are sufficient for a reaction in the electrochemical reaction portion can be secured, and thus the reaction efficiency in the electrochemical element can be improved.

In another characteristic configuration of the electrochemical element according to the present invention, the gas-permeable portion is a hole region provided with a plurality of through holes that pass through at least a portion of the plate-like support.

With this characteristic configuration, the hole region provided with a plurality of through holes that pass through at least a portion of the plate-like support serves as the gas-permeable portion, thus making it possible to provide at least a portion of the plate-like support with the gas-permeable portion more easily and selectively and further improve the strength of the plate-like support. Accordingly, an electrochemical element having more excellent strength and durability can be more easily realized.

In another characteristic configuration of the electrochemical element according to the present invention, the plate-like support includes at least a first plate-like body and a second plate-like body, and the first plate-like body is formed in one piece or as a continuous one constituted by separately formed portions, along a plate-like face of the first plate-like body.

With this characteristic configuration, the first plate-like body that is formed in one piece or as a continuous one constituted by separately formed portions supports the second plate-like body, and thus the second plate-like body has increased mechanical strength. As a result, the electrochemical element supported by the plate-like support including the second plate-like body has increased flexural strength.

Another characteristic configuration of the electrochemical element according to the present invention further includes a manifold that is collectively in communication with the plurality of passages and through which the gas flows.

With this characteristic configuration, when the manifold is provided at inlets through which the gas flows into the passages, the gas collectively flows into the plurality of passages from the manifold in which the gas is once stored. Accordingly, a difference in pressure at the inlets through which the gas flows into the plurality of passages can be reduced, and thus the flow rates of the gas in the plurality of passages can be made substantially equal at a random position in the flow-intersection direction. When the manifold is provided at outlets through which the gas flows from the passages, gas discharged or produced through the electrochemical reaction can be efficiently collected.

A characteristic configuration of an electrochemical module according to the present invention includes
a plurality of the electrochemical elements,
wherein the plurality of electrochemical elements are arranged side by side in a state in which one electrochemical element is electrically connected to another electrochemical element, and the plate-like supports are opposed to each other.

A characteristic configuration of an electrochemical device according to the present invention includes at least the electrochemical element or the electrochemical module and a fuel converter, wherein gas containing a reducing component flows between the electrochemical element or the electrochemical module and the fuel converter. Here, a "supply unit" serves to supply gas containing a reducing component when the electrochemical element is allowed to function as a fuel cell (electrochemical power generating cell) "that converts chemical energy such as fuel into electric energy", whereas the "supply unit" serves to discharge gas containing a reducing component when the electrochemical element is allowed to function as an electrolytic (electrolysis) cell "that converts electric energy into chemical energy such as fuel".

That is, the electrochemical device includes the electrochemical module and the fuel converter and includes the fuel supply unit that allows the gas containing a reducing component to flow between the electrochemical module and the fuel converter, thus making it possible to use an existing raw fuel supply infrastructure such as city gas to realize an electrochemical device including an electrochemical module that has excellent durability, reliability, and performance. Also, it is easier to construct a system that recycles unused fuel gas that is discharged from the electrochemical module, thus making it possible to realize a highly efficient electrochemical device.

A characteristic configuration of an electrochemical device according to the present invention includes at least the electrochemical element or the electrochemical module and a power converter that extracts power from the electrochemical element or the electrochemical module.

The above-mentioned characteristic configuration is preferable because it makes it possible to boost, using a power converter, electric output obtained from the electrochemical module that has excellent durability, reliability, and performance, or to convert a direct current into an alternating current, and thus makes it easy to use the electric output obtained from the electrochemical module.

A characteristic configuration of an electrochemical device according to the present invention includes the electrochemical element or the electrochemical module, a fuel converter, and a power converter that extracts power from the electrochemical element or the electrochemical module, or supplies power to the electrochemical module.

A characteristic configuration of an electrochemical device according to the present invention includes a fuel supply unit that allows a reducing component gas to flow from a fuel converter to the electrochemical element or the electrochemical module, or from the electrochemical element or the electrochemical module to a fuel converter.

With the above-mentioned configuration, gas containing a reducing component can be supplied when a function of a fuel cell (electrochemical power generating cell) "that converts chemical energy such as fuel into electric energy" is performed, whereas gas containing a reducing component can be introduced into the fuel converter when a function of an electrolytic cell "that converts electric energy into chemical energy such as fuel" is performed.

That is, the electrochemical device includes the electrochemical module and the fuel converter and includes the fuel supply unit that allows the gas containing a reducing component to flow between the electrochemical module and the fuel converter. Therefore, in the case of operating the electrochemical module as a fuel cell, employing a configuration in which hydrogen is generated using a fuel converter such as a reformer from natural gas or the like supplied using an existing raw fuel supply infrastructure such as city gas makes it possible to realize an electrochemical device including an electrochemical module that has excellent durability, reliability, and performance. Also, it is easier to construct a system that recycles unused fuel gas that is discharged from the electrochemical module, thus making it possible to realize a highly efficient electrochemical device.

In the case of operating the electrochemical element module as an electrolytic cell, gas containing water vapor and carbon dioxide flows to an electrode layer, and a voltage is applied between the electrode layer and a counter electrode layer. As a result, in the electrode layer, electrons $e^-$ react with water molecules $H_2O$ and carbon dioxide molecules $CO_2$ to produce hydrogen molecules $H_2$, and carbon monoxide $CO$ and oxygen ions $O^{2-}$. The oxygen ions $O^{2-}$ move to the counter electrode layer through the electrolyte layer. In the counter electrode layer, the oxygen ions $O^{2-}$ release electrons and oxygen molecules $O_2$ are produced. With the reactions above, water molecules $H_2O$ are electrolyzed into hydrogen $H_2$ and oxygen $O_2$, and in the case where gas containing carbon dioxide molecules $CO_2$ flows, carbon dioxide molecules $CO_2$ are electrolyzed into carbon monoxide $CO$ and oxygen $O_2$.

In the case where gas containing water vapor and carbon dioxide molecules $CO_2$ flows, a fuel converter that synthesizes various compounds such as hydrocarbons from hydrogen, carbon monoxide, and the like generated through the above-mentioned electrolysis in the electrochemical module can be provided. With the fuel supply unit, hydrocarbon and the like produced by this fuel converter can flow to the electrochemical module or can be extracted from the system and the device and separately used as fuel or a raw chemical material.

A characteristic configuration of an energy system according to the present invention includes:
the electrochemical device; and
waste heat utilization system that reuses heat discharged from the electrochemical device or a fuel converter.

The above-mentioned characteristic configuration includes the electrochemical device and the waste heat utilization system that reuses heat discharged from the electrochemical device or the fuel converter, thus making it possible to realize an energy system that has excellent durability, reliability, and performance as well as excellent energy efficiency. It should be noted that it is also possible to realize a hybrid system that has excellent energy efficiency through combination of a power generation system that generates power with the use of combustion heat from unused fuel gas discharged from the electrochemical device.

Accordingly, it is possible to realize an electrochemical element stack that includes a small number of components and is easily produced using electrochemical elements having a structure that is easy to handle. In addition, an electrochemical module, an electrochemical device, and an energy system in which the electrochemical element stack is used can be provided at low cost.

DETAILED DESCRIPTION OF THE INVENTION

Hereinafter, an energy system, an electrochemical device, an electrochemical module, and an electrochemical element according to an embodiment will be described with reference to the drawings.

Energy System, Electrochemical Device

Figure 1:
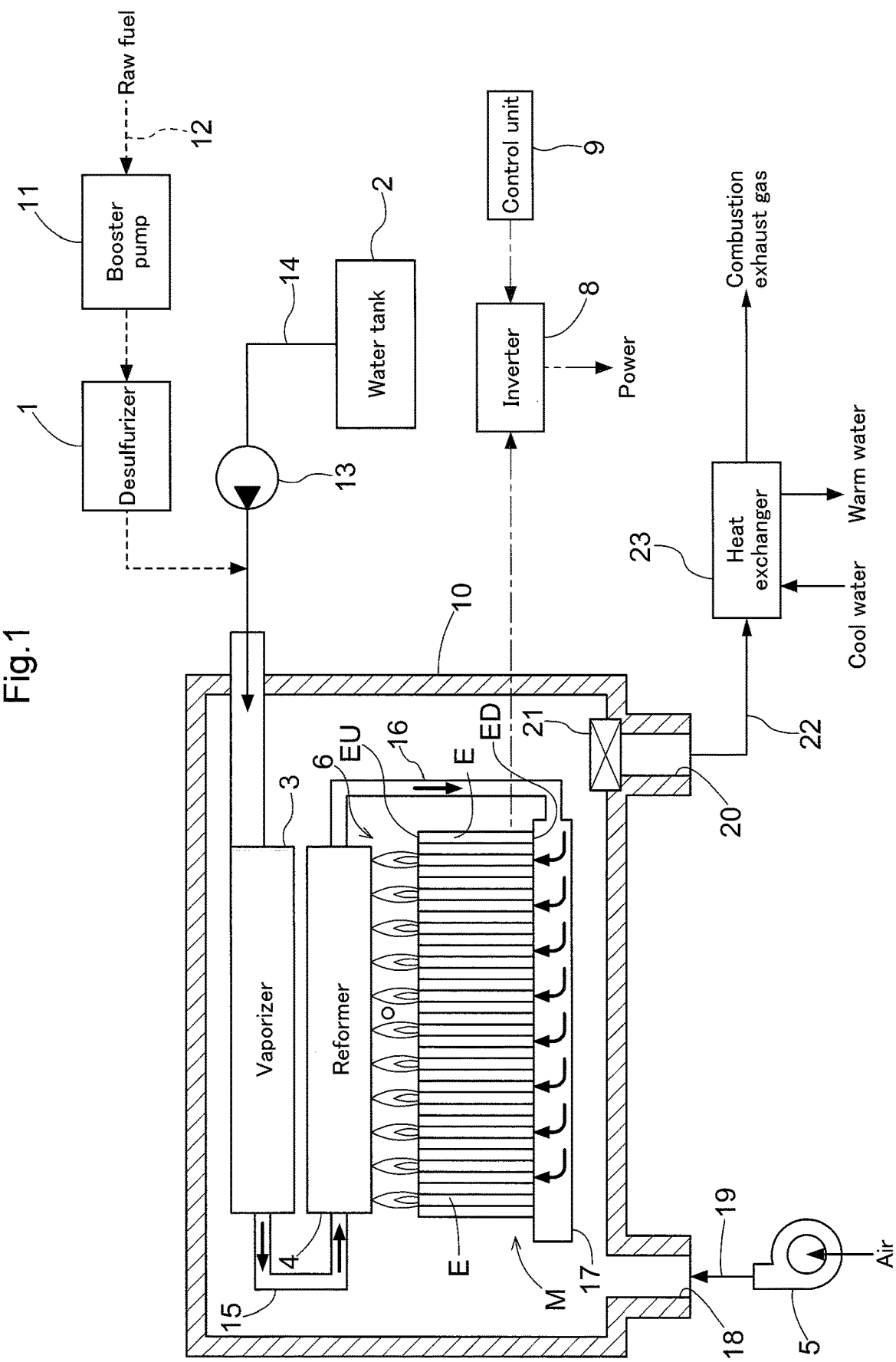
FIG. 1 is a schematic view showing an overall configuration of an energy system according to an embodiment.

FIG. 1 shows an overview of an energy system and an electrochemical device.

The energy system includes the electrochemical device, and a heat exchanger 23 serving as a waste heat utilization system that reuses heat discharged from the electrochemical device.

The electrochemical device includes: an electrochemical module M; a fuel supply unit that has a desulfurizer 1 and a reformer (a fuel converter such as a reformer; referred to as a "reformer" hereinafter) 4 and allows fuel gas containing a reducing component to flow to the electrochemical module M; and an inverter (an example of a power converter) 8 that extracts power from the electrochemical module M.

Specifically, the electrochemical device includes the desulfurizer 1, a water tank 2, a vaporizer 3, the reformer 4, a blower 5, a combustion unit 6, the inverter 8, a control unit 9, a storage container 10, and the electrochemical module M.

The desulfurizer 1 removes sulfur compound components contained in a hydrocarbon-based raw fuel such as city gas (i.e., performs desulfurization). When a sulfur compound is contained in the raw fuel, the inclusion of the desulfurizer 1 makes it possible to suppress an influence that the sulfur compound has on the reformer 4 or electrochemical elements E. The vaporizer 3 produces water vapor (steam) from water flowing from the water tank 2. The reformer 4 uses the water vapor (steam) produced by the vaporizer 3 to perform steam reforming of the raw fuel desulfurized by the desulfurizer 1, thus producing reformed gas (gas) containing hydrogen.

The electrochemical module M generates power by causing an electrochemical reaction to occur with use of the reformed gas flowing from the reformer 4 and air (gas) flowing from the blower 5. The combustion unit 6 mixes the reaction exhaust gas discharged from the electrochemical module M with air, and burns combustible components in the reaction exhaust gas.

The electrochemical module M includes a plurality of electrochemical elements E and a gas manifold 17. The electrochemical elements E are arranged side-by-side and electrically connected to each other, and one end portion (lower end portion) of each of the electrochemical elements E is fixed to the gas manifold 17. The electrochemical elements E generate power by causing an electrochemical reaction to occur between the reformed gas flowing through the gas manifold 17 and air flowing through the blower 5.

The inverter 8 adjusts the power output from the electrochemical module M to obtain the same voltage and frequency as electrical power received from a commercial system (not shown). The control unit 9 controls the operation of the electrochemical device and the energy system.

The vaporizer 3, the reformer 4, the electrochemical module M, and the combustion unit 6 are stored in the storage container 10. The reformer 4 performs reforming process on the raw fuel with use of combustion heat produced by the combustion of reaction exhaust gas in the combustion unit 6.

The raw fuel flows to the desulfurizer 1 through a raw fuel supply passage 12 due to the operation of a booster pump 11. The water in the water tank 2 flows to the vaporizer 3 through a water supply passage 14 due to the operation of a water pump 13. The raw fuel supply passage 12 merges with the water supply passage 14 at a location on the downstream side of the desulfurizer 1, and the water and the raw fuel, which have been merged outside of the storage container 10, flows to the vaporizer 3 provided in the storage container 10.

The water is vaporized by the vaporizer 3 to produce water vapor. The raw fuel, which contains the water vapor produced by the vaporizer 3, flows to the reformer 4 through a vapor-containing raw fuel supply passage 15. In the reformer 4, the raw fuel is subjected to steam reforming, thus producing reformed gas that includes hydrogen gas as a main component. The reformed gas produced in the reformer 4 flows to the gas manifold 17 of the electrochemical module M through a reformed gas supply passage 16.

The reformed gas that has flowed to the gas manifold 17 is distributed among the electrochemical elements E, and flows to each electrochemical element E from the lower end (one end portion) ED, which is the connection portion where the electrochemical element E and the gas manifold 17 are connected to each other. Mainly the hydrogen (reducing component) in the reformed gas is used in the electrochemical reaction in the electrochemical elements E. The reaction exhaust gas, which contains remaining hydrogen gas not used in the reaction, is discharged from the upper end (the other end portion) EU of each electrochemical element E to the combustion unit 6.

The reaction exhaust gas is burned in the combustion unit 6, and combustion exhaust gas is discharged from a combustion exhaust gas outlet 20 to the outside of the storage container 10. A combustion catalyst unit 21 (e.g., a platinum-based catalyst) is provided in the combustion exhaust gas outlet 20, and reducing components such as carbon monoxide and hydrogen contained in the combustion exhaust gas are removed by combustion. The combustion exhaust gas discharged from the combustion exhaust gas outlet 20 is sent to the heat exchanger 23 via a combustion exhaust gas discharge passage 22.

The heat exchanger 23 uses cool water flowing therein to perform heat exchange on the combustion exhaust gas produced by combustion in the combustion unit 6, thus producing warm water. In other words, the heat exchanger 23 operates as a waste heat utilization system that reuses heat discharged from the electrochemical device.

Electrochemical Module M

Next, the electrochemical module M will be described with reference to FIG. 2. The electrochemical module M includes a plurality of electrochemical elements E, and the electrochemical elements E are arranged side-by-side in a state in which a face of an electrochemical reaction portion 43 on a side other than a side on which a tubular support 31 is located in one electrochemical element E is electrically connected to a tubular support 31 of another electrochemical element E, and a plurality of tubular supports 31 are opposed to one another.

The electrochemical module M includes the gas manifold 17 from which the reformed gas containing a reducing component flows into the tubular supports 31 of the plurality of electrochemical elements E, and the lower ends ED in the axial direction of the tubular supports 31 out of the end portions of the electrochemical elements E are connected to the gas manifold 17.

The electrochemical module M is provided with gas supply spaces S through which air containing an oxidative component flows from the outside of the tubular supports 31 to the electrochemical reaction portions 43 via the blower 5.

It should be noted that, when each of the electrochemical elements E is attached to another member (the gas manifold 17 in this embodiment), the lower end ED out of the end portions of the tubular support 31 in the axial direction is fixed to the other member, and thus the other member supports the electrochemical element E in a cantilever manner.

Figure 2A:
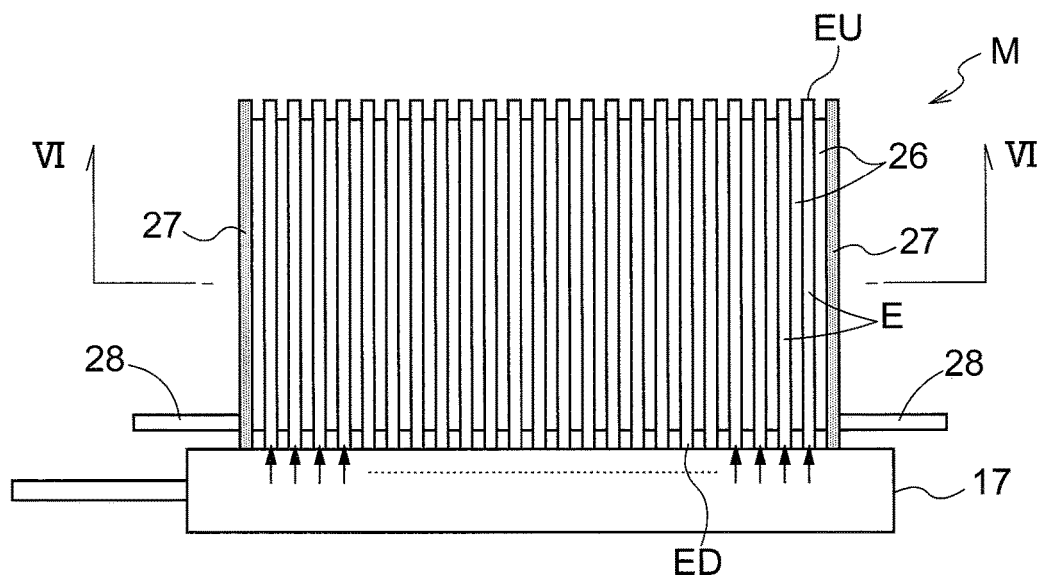
FIG. 2A is an explanatory diagram of an electrochemical module according to an embodiment.
Figure 2B:
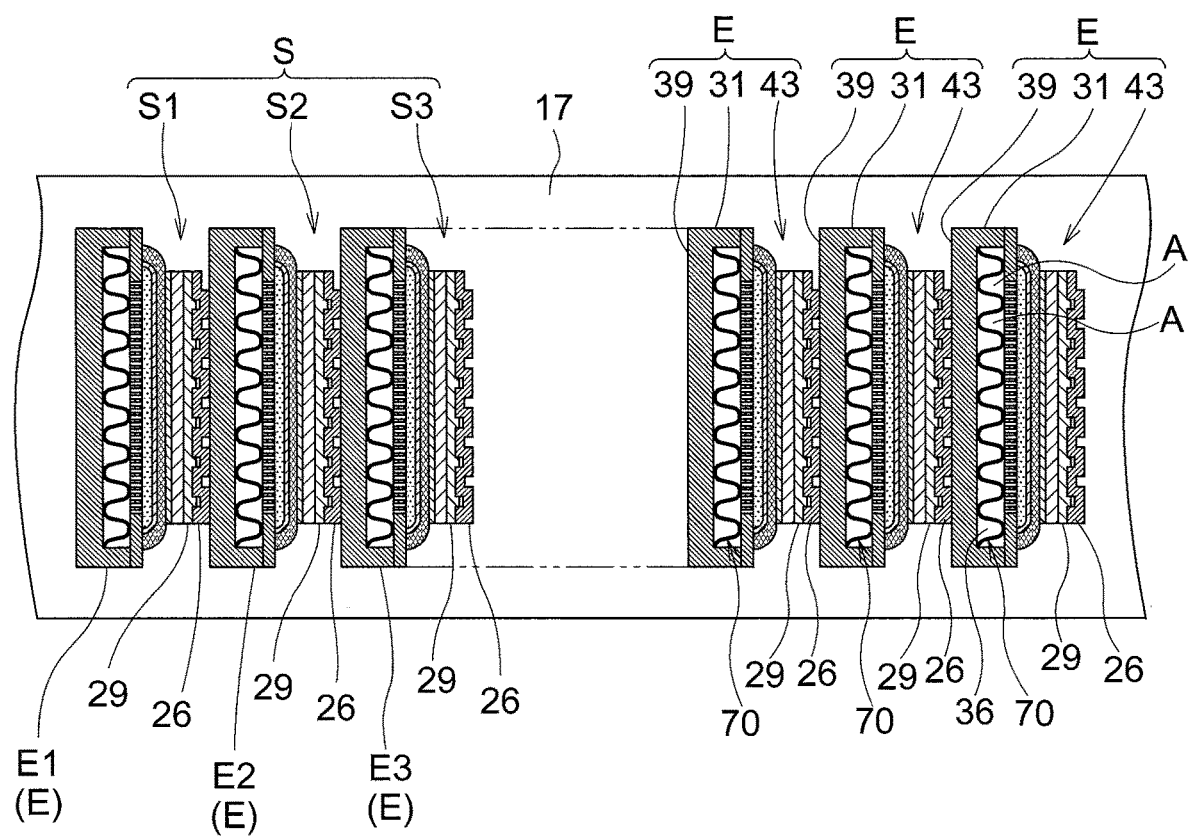
FIG. 2B is an explanatory diagram of the electrochemical module according to the embodiment.

Specifically, as shown in FIGS. 2A and 2B, the electrochemical module M includes the electrochemical elements E, the gas manifold 17, collector members 26, terminal members 27, and current extracting units 28.

Each of the electrochemical elements E has a configuration in which the electrochemical reaction portion 43 is provided on the surface (an upper face 32a of a metal support 32 (second plate-like body) shown in FIG. 4, which will be described later) of the tubular support 31 that is a hollow tube provided with an internal space, and has an elongated flat plate shape or an elongated flat bar shape as a whole. In the electrochemical element E, a partition member (first plate-like body, multiple-passage formation member) 70 for partitioning the internal space, namely a reformed gas flowing portion 36 (internal passage), which will be described later, into a plurality of partitioned passages A is provided in the reformed gas flowing portion 36. The plurality of partitioned passages A extend in a direction between the lower end ED and the upper end EU of the electrochemical element E substantially in parallel with each other. It should be noted that the electrochemical element E is configured such that the direction between the lower end ED and the upper end EU corresponds to the longitudinal direction, and the partitioned passages A extend in the longitudinal direction. The short direction of the electrochemical element E is a direction that is substantially orthogonal to the longitudinal direction in which the partitioned passages A extend.

The lower end ED of the electrochemical element E in the longitudinal direction is fixed to the gas manifold 17 in a gastight manner using a bonding member such as a glass sealing material. Accordingly, a configuration can be obtained in which the reformed gas flowing portion 36, which is the internal space of the tubular support 31, is in communication with the internal space (not shown) of the gas manifold 17 while preventing the reformed gas from leaking from, and air from flowing into, the connection portion where the electrochemical element E is connected to the gas manifold 17. It should be noted that the tubular support 31 and the gas manifold 17 are electrically insulated from each other.

The gas manifold 17 is formed in a rectangular parallelepiped shape provided with a single internal space, and functions as a buffer for the reformed gas flowing from the reformer 4. Accordingly, the reformed gas in the gas manifold 17 is substantially uniformly distributed among the plurality of electrochemical elements E at substantially the same pressure, substantially the same flow amount, substantially the same flow rate, and the like. Furthermore, the reformed gas in the gas manifold 17 is substantially uniformly distributed among the plurality of partitioned passages A in the electrochemical element E at substantially the same pressure, substantially the same flow amount, substantially the same flow rate, and the like.

The electrochemical reaction portion 43 of the electrochemical element E is formed in a film-like shape as a whole. An adhesive 29 is used to bond the collector member 26 to a face on a side other than a side on which the tubular support 31 is located, out of the front and back faces of the electrochemical reaction portion 43. In a state in which the collector member 26 and a back face 39 of another electrochemical element E are brought into contact with each other or are joined together through welding or the like, the plurality of electrochemical elements E are arranged side-by-side.

A member having electrical conductivity, gas permeability, and elasticity in the direction in which the electrochemical elements E are arranged side-by-side is used as the collector member 26. For example, an expanded metal, a metal mesh, or a felt-like member formed of a metal foil is used for the collector member 26. A material having electrical conductivity and gas permeability is used for the adhesive 29. For example, a ceramic-based adhesive is used as the adhesive 29. Accordingly, the collector member 26 and the adhesive 29 have gas permeability and gas passability, and thus air flowing from the blower 5 permeates or passes through the collector member 26 and the adhesive 29 and flows to the electrochemical reaction portion 43.

Since the collector member 26 has elasticity in the direction in which the electrochemical elements E are arranged side-by-side, the tubular support 31 supported by the gas manifold 17 in a cantilever manner can also be displaced in the side-by-side arrangement direction, and thus the robustness of the electrochemical module M against external perturbations such as vibration and temperature changes is improved.

The plurality of electrochemical elements E arranged side-by-side are held between two terminal members 27. The terminal members 27 are members that have electrical conductivity and can be elastically deformed, and the lower ends thereof are fixed to the gas manifold 17. The current extracting unit 28 that extends outward in the direction in which the electrochemical elements E are arranged side-by-side is connected to each of the terminal members 27. The current extracting units 28 are connected to the inverter 8 and sent electric current generated through power generation in the electrochemical elements E to the inverter 8.

As shown in FIGS. 2A and 2B, the electrochemical elements E arranged side-by-side are provided with the gas supply spaces S through which air (reacting gas; air containing an oxidative component) to be used in reactions in the electrochemical reaction portions 43 flows, on the lateral sides of the electrochemical reaction portions 43. The gas supply spaces S provided to the plurality of electrochemical elements E are in communication with each other on the lateral sides of the tubular supports 31 and form a continuous space. Here, the lateral sides of the electrochemical reaction portions 43 refer to a direction that is orthogonal to both the axial direction of the tubular support 31 and the direction in which the electrochemical reaction portions 43 are arranged side-by-side.

A specific description will be given with reference to FIGS. 2A and 2B. An electrochemical element E1 is provided with a gas supply space S1, an electrochemical element E2 is provided with a gas supply space S2, and an electrochemical element E3 is provided with a gas supply space S3. The gas supply space S1 and the gas supply space S2 are in communication with each other via a lateral side of the tubular support 31 of the electrochemical element E2. Also, the gas supply space S2 and the gas supply space S3 are in communication with each other via a lateral side of the tubular support 31 of the electrochemical element E3. It should be noted that, in FIGS. 2A and 2B, arrows for the gas supply spaces S indicate the upper sides of the electrochemical reaction portions 43 in the diagram, but the gas supply spaces S are also present on the lateral sides of the electrochemical reaction portions 43 located on the lower sides in the diagram.

That is, regarding two adjacent electrochemical elements (E1, E2) out of the plurality of electrochemical elements E arranged side-by-side, the electrochemical reaction portion 43 of a first electrochemical element E1 is connected to an electrochemical element E2, the tubular support 31 of the second electrochemical element E2 is connected to the first electrochemical element E1, and the gas supply space S1 provided to the first electrochemical element E1 is in communication with the gas supply space S2 provided to the second electrochemical element E2 via the lateral side of the tubular support 31 of the second electrochemical element E2.

As described above, the gas supply spaces S are in communication with each other, and thus air flowing from the blower 5 into the storage container 10 reaches the gas supply spaces S and then flows to the electrochemical reaction portions 43. Moreover, the reformed gas flows from the gas manifold 17 into the reformed gas flowing portions 36, which are the internal spaces of the tubular supports 31.

The partition member 70 partitions each of the reformed gas flowing portions 36 into the plurality of partitioned passages A, and thus the reformed gas flows into the electrochemical reaction portions 43 through the partitioned passages A. Accordingly, reactions progress in the electrochemical reaction portions 43.

Electrochemical Element E

Figure 3:
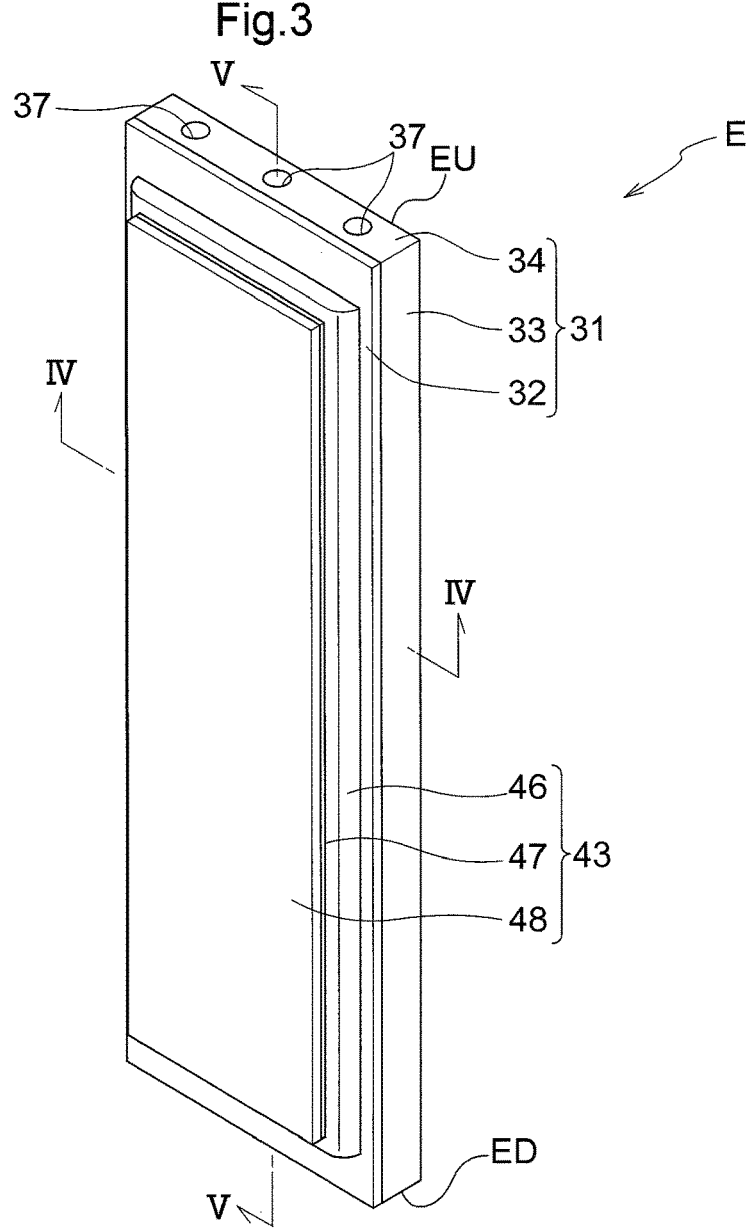
FIG. 3 is an explanatory diagram of the electrochemical module according to the embodiment.
Figure 4:
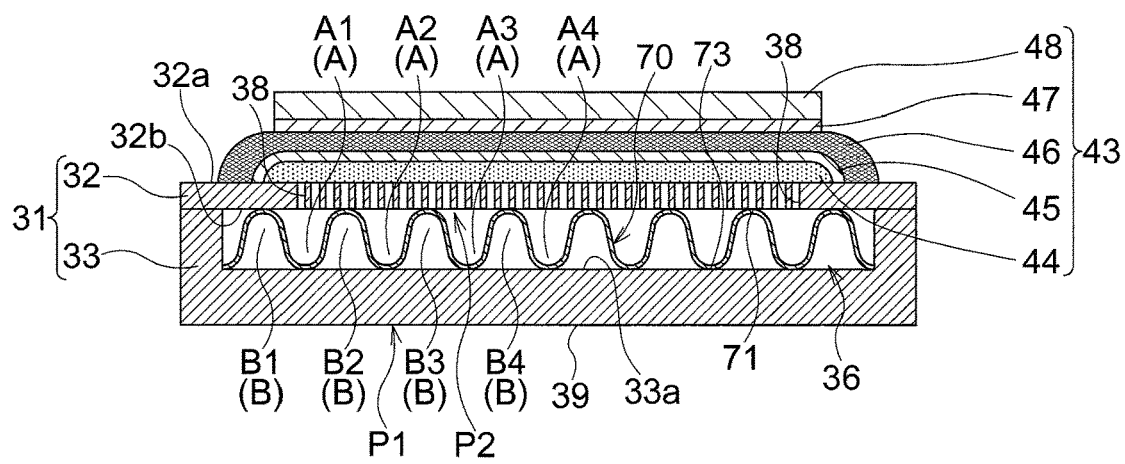
FIG. 4 is a cross-sectional view taken in the IV-IV direction in FIG. 3.
Figure 5:
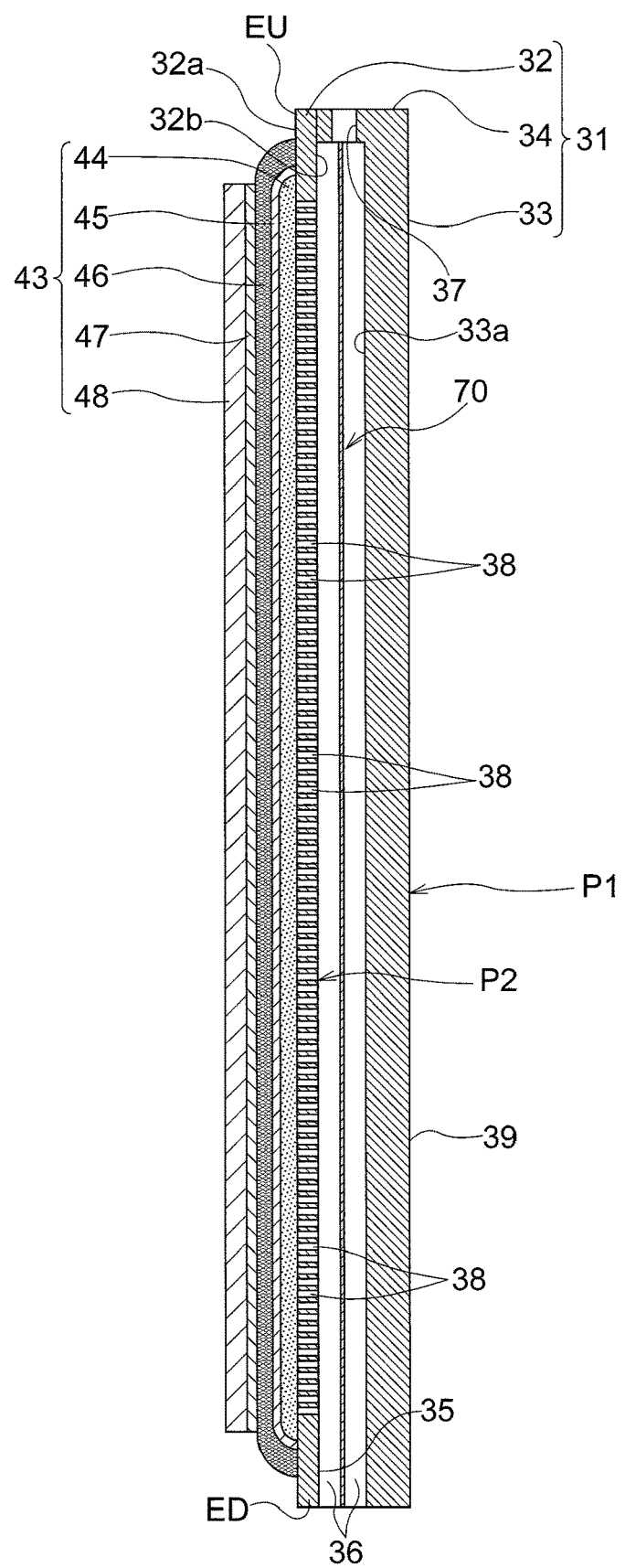
FIG. 5 is a cross-sectional view taken in the V-V direction in FIG. 3.

FIGS. 3 to 5 are schematic configuration diagrams of the electrochemical elements E. The electrochemical element E includes the tubular support 31 that has electrical conductivity and is provided with the reformed gas flowing portion 36 therein, and the electrochemical reaction portion 43 that is provided on one face of the tubular support 31 and generates power through an electrochemical reaction. The reformed gas flowing in the reformed gas flowing portion 36 flows to the electrochemical reaction portion 43 through through holes 38, which will be described later, in the tubular support 31. The overall mechanical strength of the electrochemical element E is improved due to the tubular support 31 supporting the electrochemical reaction portion 43.

Tubular Support 31

The tubular support 31 (plate-like support) has a flat plate shape or a flat bar shape as a whole, and includes a rectangular metal support 32, a U-shaped member 33 (first plate-like body, internal passage formation member) that has a U-shaped cross-section orthogonal to the longitudinal direction, and a cover portion 34. The long sides of the metal support 32 and the long sides (sides corresponding to the two vertices of the U shape) of the U-shaped member 33 are joined to each other, and the cover portion 34 blocks one end portion. Accordingly, the tubular support 31 having a flat plate shape or a flat bar shape as a whole that is provided with an internal space. The metal support 32 is arranged parallel with the central axis of the tubular support 31.

The internal space of the tubular support 31 functions as the reformed gas flowing portion 36. Reaction exhaust gas outlets 37 are formed in the cover portion 34. The opposite end portion that is opposed to the end portion provided with the cover portion 34 is open, and functions as a reformed gas inlet 35.

Figure 7:
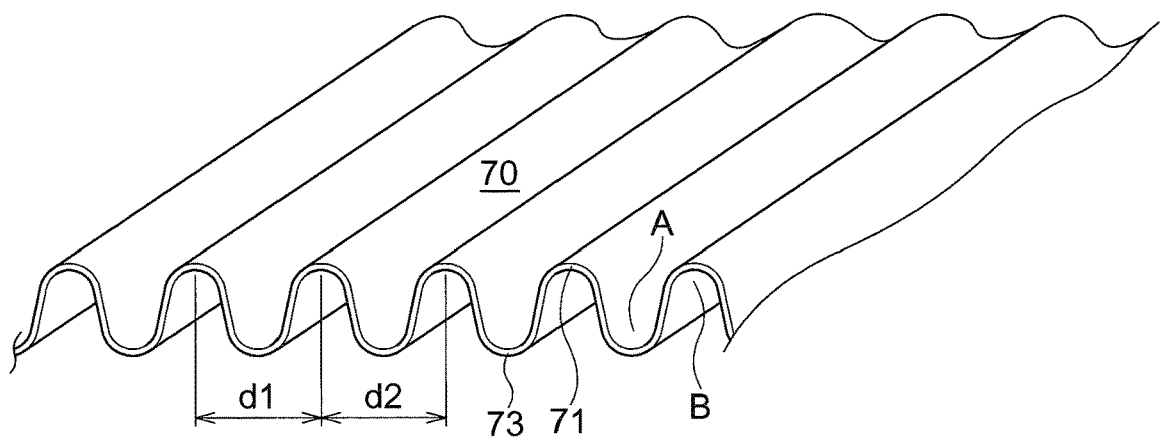
FIG. 7 is a perspective view of a partition member.

The partition member 70 that partitions the reformed gas flowing portion 36 into the plurality of partitioned passages A is arranged in the reformed gas flowing portion 36, which is the internal space. As shown in FIG. 7, the partition member 70 is, for example, a continuous wavelike plate and has a substantially uniform thickness. In the wavelike plate, multiple crests and troughs with the same shape are repeatedly formed in one direction, and the crests and the troughs extend in a direction orthogonal to the above-mentioned direction. In the case of the partition member 70 shown in FIG. 7, the crests and troughs are formed such that the widths between top portions 71 of the adjacent troughs are substantially equal. For example, widths d1 and d2 are substantially equal. It should be noted that examples of the shape of the wavelike plate include a shape formed by triangular crests and troughs, a shape formed by tetragonal crests and troughs, and a sine curve. For example, the wavelike plate may be a corrugated plate.

Such a partition member 70 is arranged in the reformed gas flowing portion 36 such that the direction in which the crests and the troughs extend is in parallel with the central axis of the tubular support 31, namely the longitudinal direction. The top portions 71 of the crests of the partition member 70 are in contact with the lower face 32b of the metal support 32, and bottom portions 73 of the troughs are in contact with a bottom face 33a of the U-shaped member 33 that faces the reformed gas flowing portion 36. Accordingly, in the reformed gas flowing portion 36, spaces surrounded by the lower face 32b of the metal support 32 and the partition member 70 form the plurality of partitioned passages A that extend in the longitudinal direction of the tubular support 31. Also, in the reformed gas flowing portion 36, spaces surrounded by the bottom face 33a of the U-shaped member 33 and the partition member 70 form a plurality of partitioned passages B that extend in the longitudinal direction of the tubular support 31. As shown in FIG. 4, the partitioned passages A and the partitioned passages B are alternately formed.

The flow rates of the reformed gas in the plurality of partitioned passages A will be described with reference to FIG. 8. The reformed gas flows from the gas manifold 17 into the plurality of partitioned passages A through the reformed gas inlet 35 that is located at the lower end ED of the electrochemical element E. The reformed gas that has flowed into the plurality of partitioned passages A flows in the partitioned passages A from the lower end ED toward the upper end EU in the longitudinal direction (gas flowing direction) corresponding to the axial direction of the tubular support 31. The flow rates of the reformed gas are made substantially equal at multiple random positions in the short direction (flow-intersection direction) that orthogonally intersects the longitudinal direction by a flow straightening effect due to the reformed gas flowing along the plurality of partitioned passages A compared with the case where the reformed gas flows in a reformed gas flowing portion 36 that is not partitioned.

Figure 8:
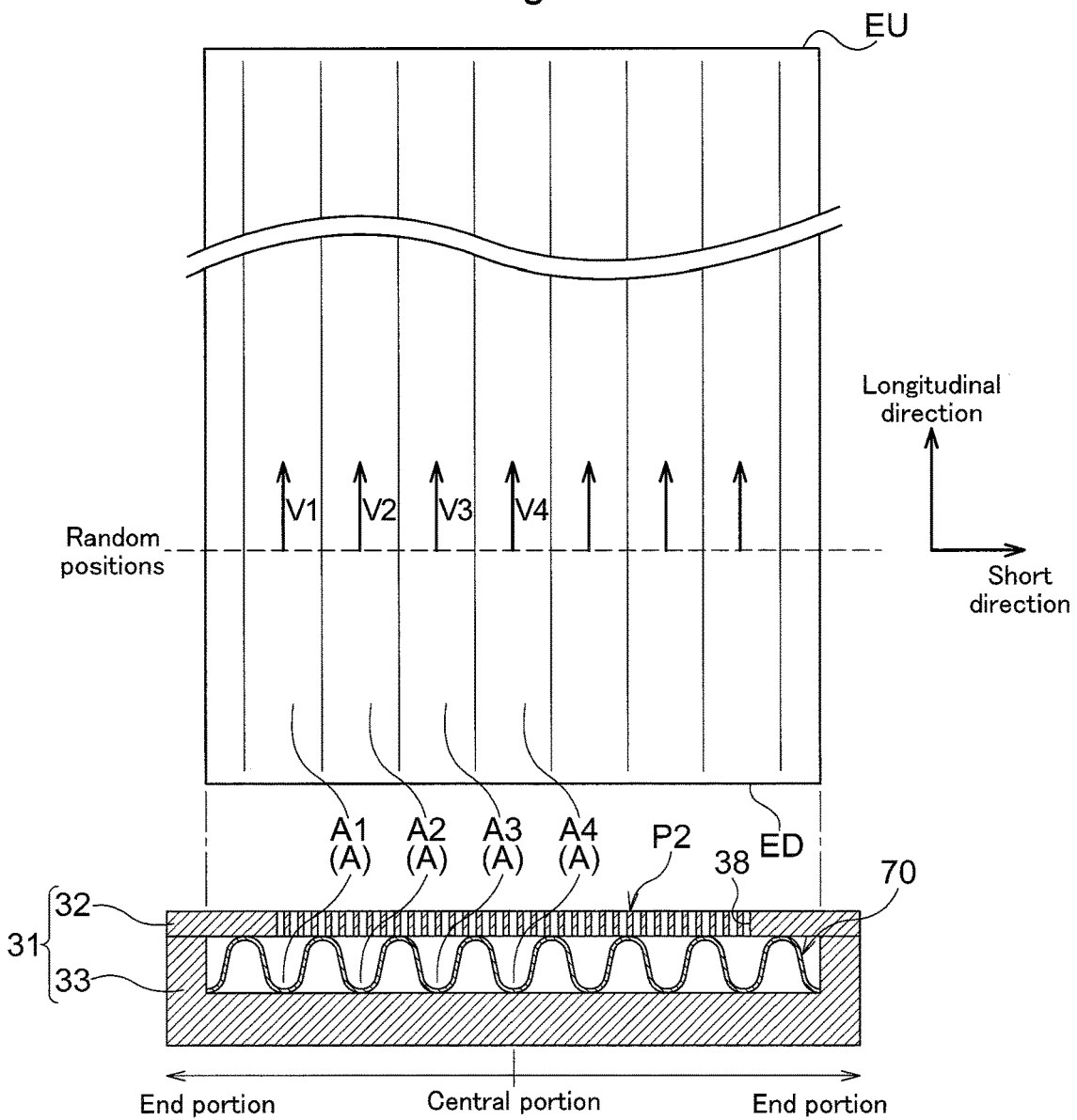
FIG. 8 is an explanatory diagram showing flow rates in partitioned passages A.

FIG. 8 shows flow rates V1 to V4 at multiple random positions in the short direction of the tubular support 31. V4 indicates the magnitude of the flow rate of the reformed gas at the central portion of the tubular support 31 in the short direction. V3, V2, and V1 indicate the magnitudes of the flow rates in the stated order from the central portion toward the end portion in the short direction. As shown in FIG. 8, the flow rates of the reformed gas are substantially equal at multiple random positions including the central portion and the two end portions of the tubular support 31 in the short direction. Thus, the amounts of the reformed gas that flows from the partitioned passages A into the electrochemical reaction portion 43 through the through holes 38 of the tubular support 31 can be made substantially equal at multiple random positions including the central portion and the two end portions in the short direction. Accordingly, an electrochemical reaction can be caused to occur in the overall electrochemical element E including even the central portion and the two end portions in the short direction, thus making it possible to improve power generation efficiency.

It should be noted that, as described above, the reformed gas stored in a single internal space of the gas manifold 17 is substantially uniformly distributed among the plurality of partitioned passages A in the electrochemical element E at substantially the same pressure, substantially the same flow amount, substantially the same flow rate, and the like. Accordingly, the flow rates of the reformed gas in the partitioned passages A can also be made substantially equal by causing substantially no differences in the pressure, the flow amount, and the flow rate of the reformed gas at the entrances of the plurality of partitioned passages A through which the reformed gas is introduced.

Materials that have excellent electron conductivity, thermal resistance, oxidation resistance, and corrosion resistance are used as the materials of the metal support 32, the U-shaped member 33, and the cover portion 34. Examples thereof include ferrite-based stainless steel, austenite-based stainless steel, and a nickel-based alloy. That is, the tubular support 31 has a robust configuration. In particular, ferrite-based stainless steel is favorably used. It should be noted that the metal support 32, the U-shaped member 33, and the cover portion 34 need to be formed using a gas non-permeable material in order to form a gas flow inhibition portion P1, which will be described later.

When ferrite-based stainless steel is used as a material of the tubular support 31, its thermal expansion coefficient is close to that of YSZ (yttria-stabilized zirconia), GDC (gadolinium-doped ceria; also called CGO), or the like, which is used as the material of the electrochemical reaction portion 43. Accordingly, even if low and high temperature cycling is repeated, the electrochemical element E is less likely to be damaged. Therefore, this is preferable due to being able to realize an electrochemical element E that has excellent long-term durability.

It should be noted that the material of the tubular support 31 is preferably a material having a thermal conductivity of more than 3 $Wm^{-1}K^{-1}$, and more preferably a material having a thermal conductivity of more than 10 $Wm^{-1}K^{-1}$. For example, stainless steel has a thermal conductivity of about 15 to 30 $Wm^{-1}K^{-1}$ and is thus favorable as a material of the tubular support 31.

It is further desirable that a high-toughness material that is resistant to brittle fracture is used as a material of the tubular support 31. Metal materials have a higher toughness than ceramic materials or the like, and are thus favorable as a material of the tubular support 31.

The metal support 32 is provided with the plurality of through holes 38 that penetrate the front face and the back face of the metal support 32. Gas can flow between the inside and the outside of the tubular support 31 through the through holes 38. That is, a hole region P2 provided with the plurality of through holes 38 functions as a gas-permeable portion P2. On the other hand, gas cannot flow between the inside and the outside of the tubular support 31 through regions in the metal support 32 and the U-shaped member 33 that are not provided with the through holes 38. Accordingly, these regions function as gas flow inhibition portions P1.

Electrochemical Reaction Portion 43

As shown in FIGS. 4 and 5, the electrochemical reaction portion 43 includes an electrode layer 44 formed on the metal support 32, an intermediate layer 45 formed on the electrode layer 44, and an electrolyte layer 46 formed on the intermediate layer 45. The electrochemical reaction portion 43 further includes a reaction preventing layer 47 formed on the electrolyte layer 46, and a counter electrode layer 48 formed on the reaction preventing layer 47. Specifically, the counter electrode layer 48 is formed above the electrolyte layer 46, and the reaction preventing layer 47 is formed between the electrolyte layer 46 and the counter electrode layer 48. The electrode layer 44 is porous, and the electrolyte layer 46 is dense. It should be noted that, in the electrochemical element E, a member that covers all or a portion of the lateral side of the electrochemical reaction portion 43 is not provided, and the lateral side of the electrochemical reaction portion 43 is open.

Metal Support 32

The metal support 32 maintains the strength of the electrochemical element E by supporting the electrode layer 44, the intermediate layer 45, the electrolyte layer 46, and the like. That is, the metal support 32 serves as a support that supports the electrochemical element E.

A material that has excellent electron conductivity, thermal resistance, oxidation resistance, and corrosion resistance is used as a material of the metal support 32. Examples thereof include ferrite-based stainless steel, austenite-based stainless steel, and a nickel-based alloy. In particular, an alloy containing chromium is favorably used. In this embodiment, the metal support 32 is made of a Fe—Cr based alloy that contains Cr in an amount of 18 mass % or more and 25 mass % or less, but a Fe—Cr based alloy that contains Mn in an amount of 0.05 mass % or more, a Fe—Cr based alloy that contains Ti in an amount of 0.15 mass % or more and 1.0 mass % or less, a Fe—Cr based alloy that contains Zr in an amount of 0.15 mass % or more and 1.0 mass % or less, a Fe—Cr based alloy that contains Ti and Zr, a total content of Ti and Zr being 0.15 mass % or more and 1.0 mass % or less, and a Fe—Cr based alloy that contains Cu in an amount of 0.10 mass % or more and 1.0 mass % or less are particularly favorable.

The metal support 32 has a plate shape as a whole. The metal support 32 is provided with a plurality of penetration spaces that pass through the metal support 32 from the front face, which is a face on which the electrode layer 44 is provided, to the back face. The penetration space allows gas to permeate from the back face of the metal support 32 to the front face thereof. It should be noted that a configuration is also possible in which the plate-like metal support 32 is deformed into, for example, a box shape, a cylindrical shape, or the like through bending or the like and used.

A metal oxide layer (not shown) serving as a diffusion suppressing layer is provided on the surface of the metal support 32. That is, the diffusion suppressing layer is formed between the metal support 32 and the electrode layer 44, which will be described later. The metal oxide layer is provided not only on the face of the metal support 32 exposed to the outside but also the face (interface) that is in contact with the electrode layer 44. The metal oxide layer can also be provided on the inner faces of the penetration spaces. Element interdiffusion that occurs between the metal support 32 and the electrode layer 44 can be suppressed due to this metal oxide layer. For example, when ferrite-based stainless steel containing chromium is used in the metal support 32, the metal oxide layer is mainly made of a chromium oxide. The metal oxide layer containing the chromium oxide as the main component suppresses diffusion of chromium atoms and the like of the metal support 32 to the electrode layer 44 and the electrolyte layer 46. The metal oxide layer need only have such a thickness that allows both high-diffusion prevention and low electric resistance to be achieved.

The metal oxide layer can be formed using various techniques, but it is favorable to use a technique of oxidizing the surface of the metal support 32 to obtain a metal oxide. Also, the metal oxide layer may be formed on the surface of the metal support 32 by using a spray coating technique (a technique such as thermal spraying technique, an aerosol deposition technique, an aerosol gas deposition technique, a powder jet deposition technique, a particle jet deposition technique, or a cold spraying technique), a PVD technique such as a sputtering technique or PLD technique, or a CVD technique, or may be formed by plating and oxidation treatment. Furthermore, the metal oxide layer may also contain a spinel phase that has high electrical conductivity, or the like.

When a ferrite-based stainless steel material is used to form the metal support 32, its thermal expansion coefficient is close to that of YSZ (yttria-stabilized zirconia), GDC (gadolinium-doped ceria; also called CGO), or the like, which is used as the material of the electrode layer 44 and the electrolyte layer 46. Accordingly, even if low and high temperature cycling is repeated, the electrochemical element E is less likely to be damaged. Therefore, this is preferable due to being able to realize an electrochemical element E that has excellent long-term durability.

Electrode Layer

As shown in FIG. 4, the electrode layer 44 can be provided as a thin layer in a region that is larger than the region provided with the penetration spaces, on the front face of the metal support 32. When it is provided as a thin layer, the thickness can be set to approximately 1 μm to 100 μm, and preferably 5 μm to 50 μm, for example. This thickness makes it possible to ensure sufficient electrode performance while also achieving cost reduction by reducing the amount of expensive electrode layer material that is used. The region provided with the penetration spaces is entirely covered by the electrode layer 44. That is, the penetration spaces are formed inside the region of the metal support 32 in which the electrode layer 44 is formed. In other words, all the penetration spaces are provided facing the electrode layer 44.

A composite material such as NiO-GDC, Ni-GDC, NiO—YSZ, Ni—YSZ, CuO—$CeO_2$, or Cu—$CeO_2$ can be used as a material of the electrode layer 44, for example. In these examples, GDC, YSZ, and $CeO_2$ can be called the aggregate of the composite material. It should be noted that it is preferable to form the electrode layer 44 using low-temperature calcining (not performing calcining treatment in a high temperature range of higher than 1100° C., but rather performing a wet process using calcining treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Due to these processes that can be used in a low temperature range, a favorable electrode layer 44 is obtained without using calcining in a high temperature range of higher than 1100° C., for example. Therefore, this is preferable due to being able to prevent damage to the metal support 32, suppress element interdiffusion between the metal support 32 and the electrode layer 44, and realize an electrochemical element that has excellent durability. Furthermore, using low-temperature calcining makes it possible to facilitate handling of raw materials and is thus more preferable.

The inside and the surface of the electrode layer 44 are provided with a plurality of pores in order to impart gas permeability to the electrode layer 44.

That is, the electrode layer 44 is formed as a porous layer. The electrode layer 44 is formed, for example, to have a denseness of 30% or more and less than 80%. Regarding the size of the pores, a size suitable for smooth progress of an electrochemical reaction can be selected as appropriate. It should be noted that the "denseness" is a ratio of the material of the layer to the space and can be represented by a formula "1−porosity", and is equivalent to relative density.

Intermediate Layer

As shown in FIG. 4, the intermediate layer 45 (intervening layer) can be formed as a thin layer on the electrode layer 44 so as to cover the electrode layer 44. When it is formed as a thin layer, the thickness can be set to approximately 1 μm to 100 μm, preferably approximately 2 μm to 50 μm, and more preferably approximately 4 μm to 25 μm, for example. This thickness makes it possible to ensure sufficient performance while also achieving cost reduction by reducing the amount of expensive intermediate layer material that is used. YSZ (yttria-stabilized zirconia), SSZ (scandia-stabilized zirconia), GDC (gadolinium-doped ceria), YDC (yttrium-doped ceria), SDC (samarium-doped ceria), or the like can be used as the material of the intermediate layer 45. In particular, ceria-based ceramics are favorably used.

It is preferable to form the intermediate layer 45 using low-temperature calcining (not performing calcining treatment in a high temperature range of higher than 1100° C., but rather performing a wet process using calcining treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Due to these film formation processes that can be used in a low temperature range, an intermediate layer 45 is obtained without using calcining in a high temperature range of higher than 1100° C., for example. Therefore, it is possible to prevent damage to the metal support 32, suppress element interdiffusion between the metal support 32 and the electrode layer 44, and realize an electrochemical element E that has excellent durability. Furthermore, using low-temperature calcining makes it possible to facilitate handling of raw materials and is thus more preferable.

It is preferable that the intermediate layer 45 has oxygen ion (oxide ion) conductivity. It is more preferable that the intermediate layer 45 has both oxygen ion (oxide ion) conductivity and electron conductivity, namely mixed conductivity. The intermediate layer 45 that has these properties is suitable for application to the electrochemical element E.

Electrolyte Layer

As shown in FIG. 4, the electrolyte layer 46 is formed as a thin layer on the intermediate layer 45 so as to cover the electrode layer 44 and the intermediate layer 45. The electrolyte layer 46 can also be formed as a thin film having a thickness of 10 μm or less. Specifically, as shown in FIG. 4, the electrolyte layer 46 is provided on both the intermediate layer 45 and the metal support 32 (spanning the intermediate layer 45 and the metal support 32). Configuring the electrolyte layer 46 in this manner and joining the electrolyte layer 46 to the metal support 32 make it possible to allow the electrochemical element to have excellent toughness as a whole.

Also, as shown in FIG. 4, the electrolyte layer 46 is provided in a region that is larger than the region provided with the penetration spaces, on the front face of the metal support 32. That is, the penetration spaces are formed inside the region of the metal support 32 in which the electrolyte layer 46 is formed.

The leakage of gas from the electrode layer 44 and the intermediate layer 45 can be suppressed in the vicinity of the electrolyte layer 46. A description of this will be given. When the electrochemical element E is used as a constitutional element of a SOFC, gas flows from the back side of the metal support 32 to the electrode layer 44 through the penetration spaces during the operation of the SOFC. In a region where the electrolyte layer 46 is in contact with the metal support 32, leakage of gas can be suppressed without providing another member such as a gasket. It should be noted that, although the entire vicinity of the electrode layer 44 is covered by the electrolyte layer 46 in this embodiment, a configuration in which the electrolyte layer 46 is provided on the electrode layer 44 and the intermediate layer 45 and a gasket or the like is provided in its vicinity may also be adopted.

Electrolyte materials having oxygen ion conductivity such as YSZ (yttria-stabilized zirconia), SSZ (scandia-stabilized zirconia), GDC (gadolinium-doped ceria), YDC (yttrium-doped ceria), SDC (samarium-doped ceria), LSGM (strontium- and magnesium-doped lanthanum gallate), and the like, and electrolyte materials having hydrogen ion conductivity such as perovskite oxides can be used as a material of the electrolyte layer 46. In particular, zirconia-based ceramics are favorably used. Using zirconia-based ceramics for the electrolyte layer 46 makes it possible to increase the operation temperature of the SOFC in which the electrochemical element E is used compared with the case where ceria-based ceramics and various materials having hydrogen ion conductivity are used. For example, when the electrochemical element E is used in the SOFC, by adopting a system configuration in which a material such as YSZ that can exhibit high electrolyte performance even in a high temperature range of approximately 650° C. or higher is used as the material of the electrolyte layer 46, a hydrocarbon-based raw fuel such as city gas or LPG is used as the raw fuel for the system, and the raw fuel is reformed into anode gas of the SOFC through steam reforming or the like, it is thus possible to construct a high-efficiency SOFC system in which heat generated in a cell stack of the SOFC is used to reform raw fuel gas.

It is preferable to form the electrolyte layer 46 using low-temperature calcining (not performing calcining treatment in a high temperature range of higher than 1100° C., but rather performing a wet process using calcining treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Due to these film formation processes that can be used in a low temperature range, an electrolyte layer 46 that is dense and has high gas-tightness and gas barrier properties is obtained without using calcining in a high temperature range of higher than 1100° C., for example. Therefore, it is possible to prevent damage to the metal support 32, suppress element interdiffusion between the metal support 32 and the electrode layer 44, and realize an electrochemical element E that has excellent performance and durability. In particular, using low-temperature calcining, a spray coating technique, or the like makes it possible to realize a low-cost element and is thus preferable. Furthermore, using a spray coating technique makes it easy to obtain, in a low temperature range, an electrolyte layer that is dense and has high gas-tightness and gas barrier properties, and is thus more preferable.

The electrolyte layer 46 is given a dense configuration in order to block gas leakage of anode gas and cathode gas and exhibit high ion conductivity. The electrolyte layer 46 preferably has a denseness of 90% or more, more preferably 95% or more, and even more preferably 98% or more. When the electrolyte layer 46 is formed as a uniform layer, the denseness is preferably 95% or more, and more preferably 98% or more. When the electrolyte layer 46 has a multilayer configuration, at least a portion thereof preferably includes a layer (dense electrolyte layer) having a denseness of 98% or more, and more preferably a layer (dense electrolyte layer) having a denseness of 99% or more. The reason for this is that an electrolyte layer that is dense and has high gas-tightness and gas barrier properties can be easily formed due to such a dense electrolyte layer being included as a portion of the electrolyte layer even when the electrolyte layer has a multilayer configuration.

Reaction Preventing Layer

The reaction preventing layer 47 can be formed as a thin layer on the electrolyte layer 46. When it is formed as a thin layer, the thickness can be set to approximately 1 µm to 100 µm, preferably approximately 2 µm to 50 µm, and more preferably approximately 3 µm to 15 µm, for example. This thickness makes it possible to ensure sufficient performance while also achieving cost reduction by reducing the amount of expensive reaction preventing layer material that is used. The material of the reaction preventing layer 47 need only be capable of preventing reactions between the component of the electrolyte layer 46 and the component of the counter electrode layer 48. For example, a ceria-based material or the like is used. Materials that contain at least one element selected from the group consisting of Sm, Gd, and Y are favorably used as the material of the reaction preventing layer 47. It is preferable that at least one element selected from the group consisting of Sm, Gd, and Y is contained, and the total content of these elements is 1.0 mass % or more and 10 mass % or less. Introducing the reaction preventing layer 47 between the electrolyte layer 46 and the counter electrode layer 48 effectively suppresses reactions between the material constituting the counter electrode layer 48 and the material constituting the electrolyte layer 46 and makes it possible to improve long-term stability in performance of the electrochemical element E. Forming the reaction preventing layer 47 using, as appropriate, a method through which the reaction preventing layer 47 can be formed at a treatment temperature of 1100° C. or lower makes it possible to suppress damage to the metal support 32, suppress element interdiffusion between the metal support 32 and the electrode layer 44, and realize an electrochemical element E that has excellent performance and durability, and is thus preferable. For example, the reaction preventing layer 47 can be formed using, as appropriate, low-temperature calcining (not performing calcining treatment in a high temperature range of higher than 1100° C., but rather performing a wet process using calcining treatment in a low temperature range, for example), a spray coating technique (a technique such as a thermal spraying technique, an aerosol deposition technique, a powder jet deposition technique, a particle jet deposition technique, or a cold spraying technique), a PVD technique (e.g., a sputtering technique or a pulse laser deposition technique), a CVD technique, or the like. In particular, using low-temperature calcining, a spray coating technique, or the like makes it possible to realize a low-cost element and is thus preferable. Furthermore, using low-temperature calcining makes it possible to facilitate handling of raw materials and is thus more preferable.

Counter Electrode Layer

The counter electrode layer 48 can be formed as a thin layer on the electrolyte layer 46 or the reaction preventing layer 47. When it is formed as a thin layer, the thickness can be set to approximately 1 µm to 100 µm, and preferably approximately 5 µm to 50 µm, for example. This thickness makes it possible to ensure sufficient electrode performance while also achieving cost reduction by reducing the amount of expensive counter electrode layer material that is used. A complex oxide such as LSCF or LSM, or a ceria-based oxide, or a mixture thereof can be used as a material of the counter electrode layer 48, for example. In particular, it is preferable that the counter electrode layer 48 includes a perovskite oxide containing two or more elements selected from the group consisting of La, Sr, Sm, Mn, Co, and Fe. The counter electrode layer 48 constituted by the above-mentioned material functions as a cathode.

It should be noted that forming the counter electrode layer 48 using, as appropriate, a method through which the counter electrode layer 48 can be formed at a treatment temperature of 1100° C. or lower makes it possible to suppress damage to the metal support 32, suppress element interdiffusion between the metal support 32 and the electrode layer 44, and realize an electrochemical element E that has excellent performance and durability, and is thus preferable. For example, the counter electrode layer 48 can be formed using, as appropriate, low-temperature calcining (not performing calcining treatment in a high temperature range of higher than 1100° C., but rather performing a wet process using calcining treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. In particular, using low-temperature calcining, a spray coating technique, or the like makes it possible to realize a low-cost element and is thus preferable. Furthermore, using low-temperature calcining makes it possible to facilitate handling of raw materials and is thus more preferable.

Solid Oxide Fuel Cell

The electrochemical element E configured as described above can be used as a power generating cell for a solid oxide fuel cell when the electrochemical element is allowed to function as a fuel cell (electrochemical power generating cell). For example, fuel gas containing hydrogen flows from the back face of the metal support 32 to the electrode layer 44 through the penetration spaces, air flows to the counter electrode layer 48 serving as a counter electrode of the electrode layer 44, and the operation is performed at a temperature of 500° C. or higher and 900° C. or lower, for example. Accordingly, when the electrolyte layer 46 is made of an electrolyte material having oxygen ion conductivity, the oxygen $O_2$ included in air reacts with electrons $e^-$ in the counter electrode layer 48, thus producing oxygen ions $O^{2-}$. The oxygen ions $O^{2-}$ move to the electrode layer 44 through the electrolyte layer 46. In the electrode layer 44, the hydrogen $H_2$ included in the fuel gas that has flowed thereto reacts with the oxygen ions $O^{2-}$, thus producing water $H_2O$ and electrons $e^-$. When the electrolyte layer 46 is made of an electrolyte material having hydrogen ion conductivity, hydrogen $H_2$ included in the fuel gas that has flowed thereto releases electrons $e^-$ in the electrode layer 44, thus producing hydrogen ions $H^+$. The hydrogen ions $H^+$ move to the counter electrode layer 48 through the electrolyte layer 46. In the counter electrode layer 48, oxygen $O_2$ included in air, hydrogen ions $H^+$, and electrons $e^-$ react with each other to produce water $H_2O$. With these reactions, electromotive force is generated between the electrode layer 44 and the counter electrode layer 48. In this case, the electrode layer 44 functions as a fuel electrode (anode) of the SOFC, and the counter electrode layer 48 functions as an air electrode (cathode).

Method for Manufacturing Electrochemical Element

Next, a method for manufacturing the electrochemical element E will be described.

Electrode Layer Forming Step

In an electrode layer forming step, the electrode layer 44 is formed as a thin film in a region that is broader than the region provided with the penetration spaces, on the front face of the metal support 32. The through holes of the metal support 32 can be provided through laser processing or the like. As described above, the electrode layer 44 can be formed using low-temperature calcining (a wet process using calcining treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the metal support 32.

The following is a specific example of the case where low-temperature calcining is performed as the electrode layer forming step. First, a material paste is produced by mixing powder of the material of the electrode layer 44 and a solvent (dispersion medium), and is applied to the front face of the metal support 32. Then, the electrode layer 44 is obtained through compression molding (electrode layer smoothing step) and calcining at a temperature of 1100° C. or lower (electrode layer calcining step). Examples of compression molding of the electrode layer 44 include CIP (Cold Isostatic Pressing) molding, roll pressing molding, and RIP (Rubber Isostatic Pressing) molding. It is favorable to perform calcining of the electrode layer at a temperature of 800° C. or higher and 1100° C. or lower. The order in which the electrode layer smoothing step and the electrode layer calcining step are performed can be changed.

It should be noted that, when an electrochemical element including an intermediate layer 45 is formed, the electrode layer smoothing step and the electrode layer calcining step may be omitted, and an intermediate layer smoothing step and an intermediate layer calcining step, which will be described later, may include the electrode layer smoothing step and the electrode layer calcining step.

It should be noted that lapping molding, leveling treatment, surface cutting treatment, surface polishing treatment, or the like can also be performed as the electrode layer smoothing step.

Diffusion Suppressing Layer Forming Step

The metal oxide layer (diffusion suppressing layer) is formed on the surface of the metal support 32 during the calcining step in the above-described electrode layer forming step. It should be noted that it is preferable that the above-mentioned calcining step includes a calcining step in which the calcining atmosphere satisfies the atmospheric condition that the oxygen partial pressure is low because a high-quality metal oxide layer (diffusion suppressing layer) that has a high element interdiffusion suppressing effect and has a low resistance value is formed. In a case where a coating method that does not include calcining is performed as the electrode layer forming step, a separate diffusion suppressing layer forming step may also be included. In any case, it is desirable to perform these steps at a temperature of 1100° C. or lower such that damage to the metal support 32 can be suppressed. The metal oxide layer (diffusion suppressing layer) may be formed on the surface of the metal support 32 during the calcining step in an intermediate layer forming step, which will be described later.

Intermediate Layer Forming Step

In an intermediate layer forming step, the intermediate layer 45 is formed as a thin layer on the electrode layer 44 so as to cover the electrode layer 44. As described above, the intermediate layer 45 can be formed using low-temperature calcining (a wet process using calcining treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the metal support 32.

The following is a specific example of the case where low-temperature calcining is performed as the intermediate layer forming step.

First, a material paste is produced by mixing powder of the material of the intermediate layer 45 and a solvent (dispersion medium), and is applied to the front face of the metal support 32. Then, the intermediate layer 45 is obtained through compression molding (intermediate layer smoothing step) and calcining at a temperature of 1100° C. or lower (intermediate layer calcining step). Examples of rolling of the intermediate layer 45 include CIP (Cold Isostatic Pressing) molding, roll pressing molding, and RIP (Rubber Isostatic Pressing) molding. It is favorable to perform calcining of the intermediate layer 45 at a temperature of 800° C. or higher and 1100° C. or lower. The reason for this is that this temperature makes it possible to form an intermediate layer 45 that has high strength while suppressing damage to and deterioration of the metal support 32. It is more preferable to perform calcining of the intermediate layer 45 at a temperature of 1050° C. or lower, and more preferably 1000° C. or lower. The reason for this is that the lower the calcining temperature of the intermediate layer 45 is, the more likely it is to further suppress damage to and deterioration of the metal support 32 when forming the electrochemical element E. The order in which the intermediate layer smoothing step and the intermediate layer calcining step are performed can be changed.

It should be noted that lapping molding, leveling treatment, surface cutting treatment, surface polishing treatment, or the like can also be performed as the intermediate layer smoothing step.

Electrolyte Layer Forming Step

In an electrolyte layer forming step, the electrolyte layer 46 is formed as a thin layer on the intermediate layer 45 so as to cover the electrode layer 44 and the intermediate layer 45. The electrolyte layer 46 may also be formed as a thin film having a thickness of 10 μm or less. As described above, the electrolyte layer 46 can be formed using low-temperature calcining (a wet process using calcining treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the metal support 32.

It is desirable to perform a spray coating technique as the electrolyte layer forming step in order to form a high-quality electrolyte layer 46 that is dense and has high gas-tightness and gas barrier properties in a temperature range of 1100° C. or lower. In this case, the material of the electrolyte layer 46 is sprayed onto the intermediate layer 45 on the metal support 32, and the electrolyte layer 46 is thus formed.

Reaction Preventing Layer Forming Step

In a reaction preventing layer forming step, the reaction preventing layer 47 is formed as a thin layer on the electrolyte layer 46. As described above, the reaction preventing layer 47 can be formed using low-temperature calcining (a wet process using calcining treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the metal support 32. It should be noted that leveling treatment, surface cutting treatment, or surface polishing treatment may be performed after the formation of the reaction preventing layer 47, or pressing processing may be performed after wet formation and before calcining in order to flatten the top face of the reaction preventing layer 47.

Counter Electrode Layer Forming Step

In a counter electrode layer forming step, the counter electrode layer 48 is formed as a thin layer on the reaction preventing layer 47. As described above, the counter electrode layer 48 can be formed using low-temperature calcining (a wet process using calcining treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the metal support 32.

In this manner, the electrochemical element E can be manufactured.

It should be noted that a configuration is also possible in which the electrochemical element E does not include both or either of the intermediate layer 45 (intervening layer) and the reaction preventing layer 47. That is, a configuration is also possible in which the electrode layer 44 and the electrolyte layer 46 are in contact with each other, or a configuration is also possible in which the electrolyte layer 46 and the counter electrode layer 48 are in contact with each other. In this case, in the above-described manufacturing method, the intermediate layer forming step and the reaction preventing layer forming step are omitted. It should be noted that it is also possible to add a step of forming another layer or to form a plurality of layers of the same type one on top of another, but in any case, it is desirable to perform these steps at a temperature of 1100° C. or lower.

The electrochemical module M includes the electrochemical elements E formed as described above. When allowed to function as a fuel cell (electrochemical power generating cell), the electrochemical elements can operate as described below and generate power.

Figure 6:
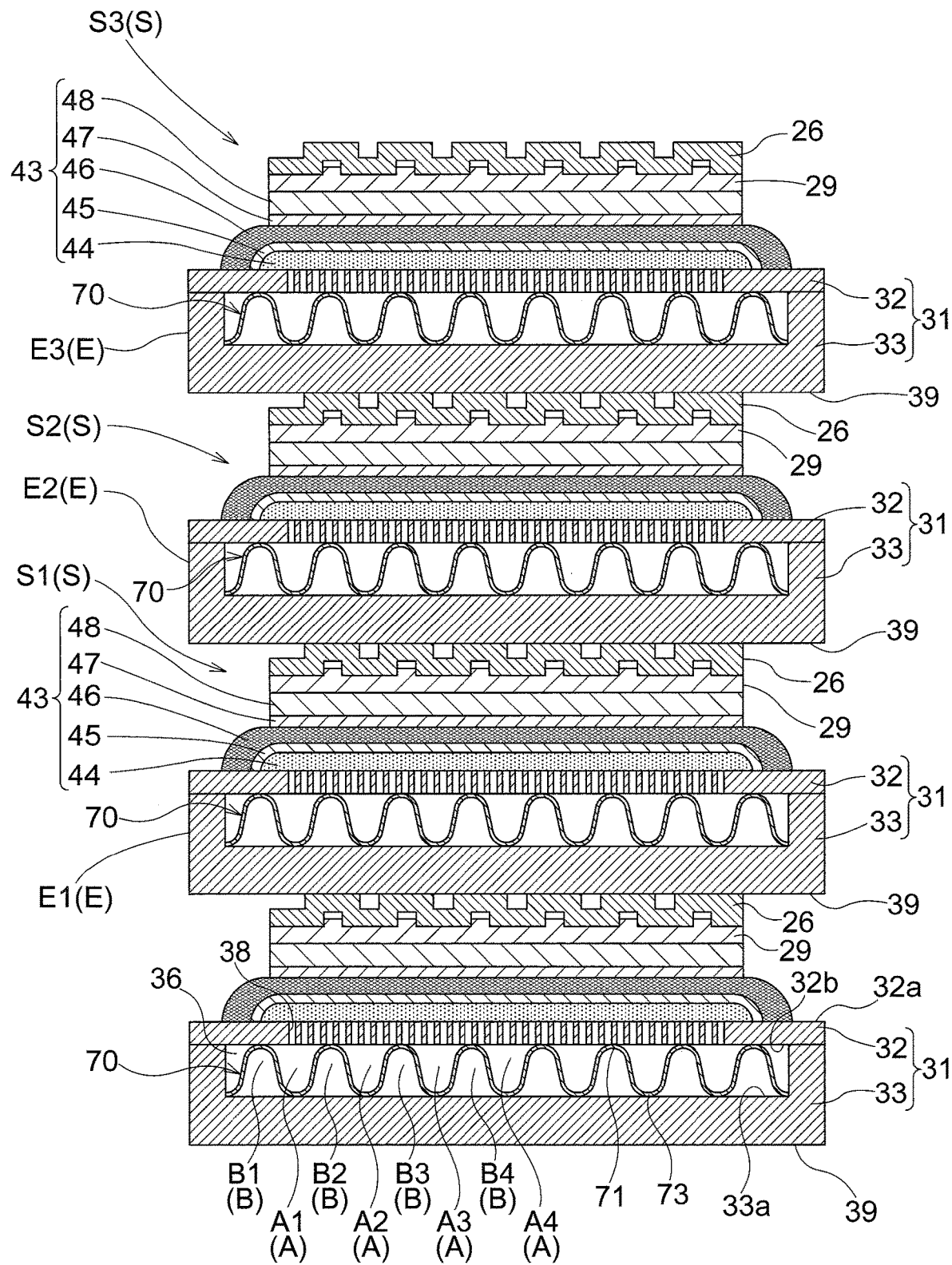
FIG. 6 is a cross-sectional view taken in the VI-VI direction in FIG. 2A.

As shown in FIGS. 2 and 6, the plurality of electrochemical elements E are arranged side-by-side on the gas manifold 17 in the state of being electrically connected to each other via the collector members 26 and the adhesive 29. Each lower end ED (end portion located on the lower side in FIG. 5) on a side other than a side on which the upper end EU provided with the cover portion 34 and the reaction exhaust gas outlets 37 is located is fixed to the gas manifold 17. The reformed gas flows to the reformed gas inlet 35 through the gas manifold 17. It should be noted that the operation temperature of the electrochemical elements E is kept at approximately 700° C.

It should be noted that, in FIG. 5, the partition member 70 extends from the lower end ED to the upper end EU provided with the reaction exhaust gas outlets 37. However, it is preferable that, in order to avoid contact with the reaction exhaust gas outlets 37, the partition member 70 is formed extending to a position that is located away from the reaction exhaust gas outlets 37 to such an extent that discharge of gas from the reaction exhaust gas outlets 37 is not inhibited.

After flowing to each of the reformed gas inlets 35, the reformed gas flows therefrom toward the reaction exhaust gas outlets 37 through the plurality of partitioned passages A formed in the reformed gas flowing portion 36. On the way thereto, a portion of the reformed gas flows from the inside of the tubular support 31 to the outside thereof through the through holes 38, and reaches the electrode layer 44 of the electrochemical reaction portion 43. As described above with reference to FIG. 8, the flow rates of the reformed gas flowing through the plurality of partitioned passages A are substantially equal at multiple random positions including the central portion and the two end portions of the tubular support 31 in the short direction. Thus, the amounts of the reformed gas that flows from the partitioned passages A into the electrochemical reaction portion 43 through the through holes 38 of the tubular support 31 can be made substantially equal at multiple random positions of the tubular support 31 in the short direction.

On the other hand, air flows from the blower 5 into the storage container 10 and reaches each of the gas supply spaces S of the electrochemical elements E. Then, the air reaches the counter electrode layer 48 of the electrochemical reaction portion 43 from the gas supply space S through the collector member 26 and the adhesive 29 or directly from the lateral side of the electrochemical reaction portion 43.

As a result, the oxygen $O_2$ included in the air reacts with electrons $e^-$ in the counter electrode layer 48, thus producing oxygen ions $O^{2-}$. The oxygen ions $O^{2-}$ move to the electrode layer 44 through the electrolyte layer 46. In the electrode layer 44, the hydrogen $H_2$ included in the fuel gas that has flowed thereto reacts with the oxygen ions $O^{2-}$, thus producing water $H_2O$ and electrons $e^-$. In addition, carbon monoxide included in the reformed gas that has flowed thereto reacts with the oxygen ions $O^{2-}$, thus producing carbon dioxide $CO_2$ and electrons $e^-$. With these reactions, electromotive force is generated between the electrode layer 44 and the counter electrode layer 48.

The collector member 26 is connected to the counter electrode layer 48 of one electrochemical reaction portion 43 via the adhesive 29, and the collector member 26 is in contact with the back face 39 of another tubular support 31. Since the plurality of electrochemical elements E are connected in series in this manner, a voltage generated in the current extracting unit 28 corresponds to the sum of the electromotive forces generated in the electrochemical elements E.

After reaching the end of the reformed gas flowing portion 36, the reformed gas is discharged, as reaction exhaust gas, from the reaction exhaust gas outlets 37 to the outside of the electrochemical element E together with remaining hydrogen gas that is not consumed in the electrochemical reaction portion 43. After discharged from the reaction exhaust gas outlets 37, the reaction exhaust gas is mixed with the air that has flowed from the blower 5 into the storage container 10, and is burned in the combustion unit 6 near the reaction exhaust gas outlets 37 to heat the reformer 4.

With the above-mentioned configuration, the flow rates of the reformed gas is made substantially equal at multiple random positions of the tubular support 31 in the short direction by a flow straightening effect due to the reformed gas flowing along the plurality of partitioned passages A, and thus the amounts of the reformed gas that flows into the electrochemical reaction portion 43 are substantially equal. Accordingly, a difference between a portion that is deficient in the reformed gas and a portion in which an excessive amount of the reformed gas flows can be reduced, and an electrochemical reaction can be caused to occur in the overall electrochemical element E, thus making it possible to improve the fuel usage rate and improve the reaction efficiency in the electrochemical element E.

For example, in the case where the reformed gas flows in the reformed gas flowing portion 36, and the flow rates of the reformed gas at the two end portions of the tubular support 31 in the short direction are different from the flow rate of the reformed gas at the central portion of the tubular support 31 in the short direction, as the reformed gas flows in the longitudinal direction, the amount of the reformed gas that flows from the two end portions at which the flow rates are slow into the electrode layer 44 becomes insufficient, and thus the concentration of the reformed gas in the gas is reduced, leading to deterioration of the electrode layer 44 due to oxidation. On the other hand, at the central portion in the short direction, the reformed gas is not used in the electrode layer 44 and is discharged from the reaction exhaust gas outlets 37 at the upper end EU of the electrochemical element E. That is, high-concentration reformed gas is discharged from the reaction exhaust gas outlets 37. Accordingly, if the electrochemical reaction is suppressed to reduce the amount of reformed gas consumed in the electrode layer 44 in order to suppress the deterioration due to oxidation at the two end portions of the electrode layer 44 at which the flow rates are slow, the amount of reformed gas that is not used in the electrode layer 44 further increases at the central portion at which the flow rate is fast. As a result, the reaction efficiency of the electrochemical reaction in the electrochemical element E decreases, and thus power generation efficiency decreases.

With the embodiment described above, the flow rates of the reformed gas are substantially equal at multiple random positions of the tubular support 31 in the short direction, and therefore, there is no need to suppress the electrochemical reaction based on the positions at which the flow rates are slow, thus making it possible to improve the reaction efficiency in the electrochemical element E. That is, the amount of reformed gas used in the electrode layer 44 can be increased to improve the reformed gas usage rate. Power generation efficiency is proportional to the product of the cell voltage of the electrochemical module M and the reformed gas usage rate. Accordingly, power generation efficiency can be improved by improving the reformed gas usage rate.

It should be noted that, in this embodiment, the electrochemical reaction portion 43 is formed on substantially the entire surface of the metal support 32. However, the electrochemical reaction portion 43 may also be divided in the longitudinal direction so as to correspond to the plurality of partitioned passages A extending in the longitudinal direction. For example, a configuration is also possible in which one electrochemical reaction portion 43 extending in the longitudinal direction is formed corresponding to one partitioned passage A, and another electrochemical reaction portion 43 that is separated from the above-mentioned electrochemical reaction portion 43 and extends in the longitudinal direction is formed corresponding to another partitioned passage A. However, when the electrochemical reaction portion 43 is formed on substantially the entire surface of the metal support 32, the electrochemical reaction portion 43 can be more easily formed compared with the case where electrochemical reaction portions 43 corresponding to the partitioned passages A are separately formed.

Next, a procedure for manufacturing the electrochemical element E will be described with reference to FIG. 9.

First, a plurality of through holes 38 are formed in the metal support 32 (#1). The through holes 38 can be formed through laser processing or the like, for example. Thus, the gas-permeable portion P2 (hole region P2) and the gas flow inhibition portion P1 are selectively provided in the metal support 32.

Next, the electrochemical reaction portion 43 is provided so as to cover the entire hole region P2 of the metal support 32 (#2). The electrochemical reaction portion 43 is formed by providing the electrode layer 44, the intermediate layer 45, the electrolyte layer 46, the reaction preventing layer 47, and the counter electrode layer 48 in the stated order. All of these layers are formed as films on the metal support 32. The electrochemical reaction portion 43 can be formed using, as appropriate, a wet process using printing, spraying, or the like, an aerosol deposition technique, a thermal spraying technique, a sputtering technique, a pulse laser deposition technique, or the like.

Next, the U-shaped member 33 is joined to the metal support 32, and then the partition member 70 is inserted into the reformed gas flowing portion 36 formed by the U-shaped member 33 and the metal support 32 (#3).

Lastly, the cover portion 34 provided with the reaction exhaust gas outlets 37 in advance is joined to the U-shaped member 33 and the metal support 32 (#4). These members can be joined to each other using an appropriate method such as welding.

Other Embodiments (1) In the electrochemical element E of the embodiment described above, the electrochemical reaction portion 43 is arranged on the tubular support 31 provided with an internal space serving as the reformed gas flowing portion 36. However, a configuration is also possible in which the tubular support 31 does not support the electrochemical reaction portion 43.

Figure 10:
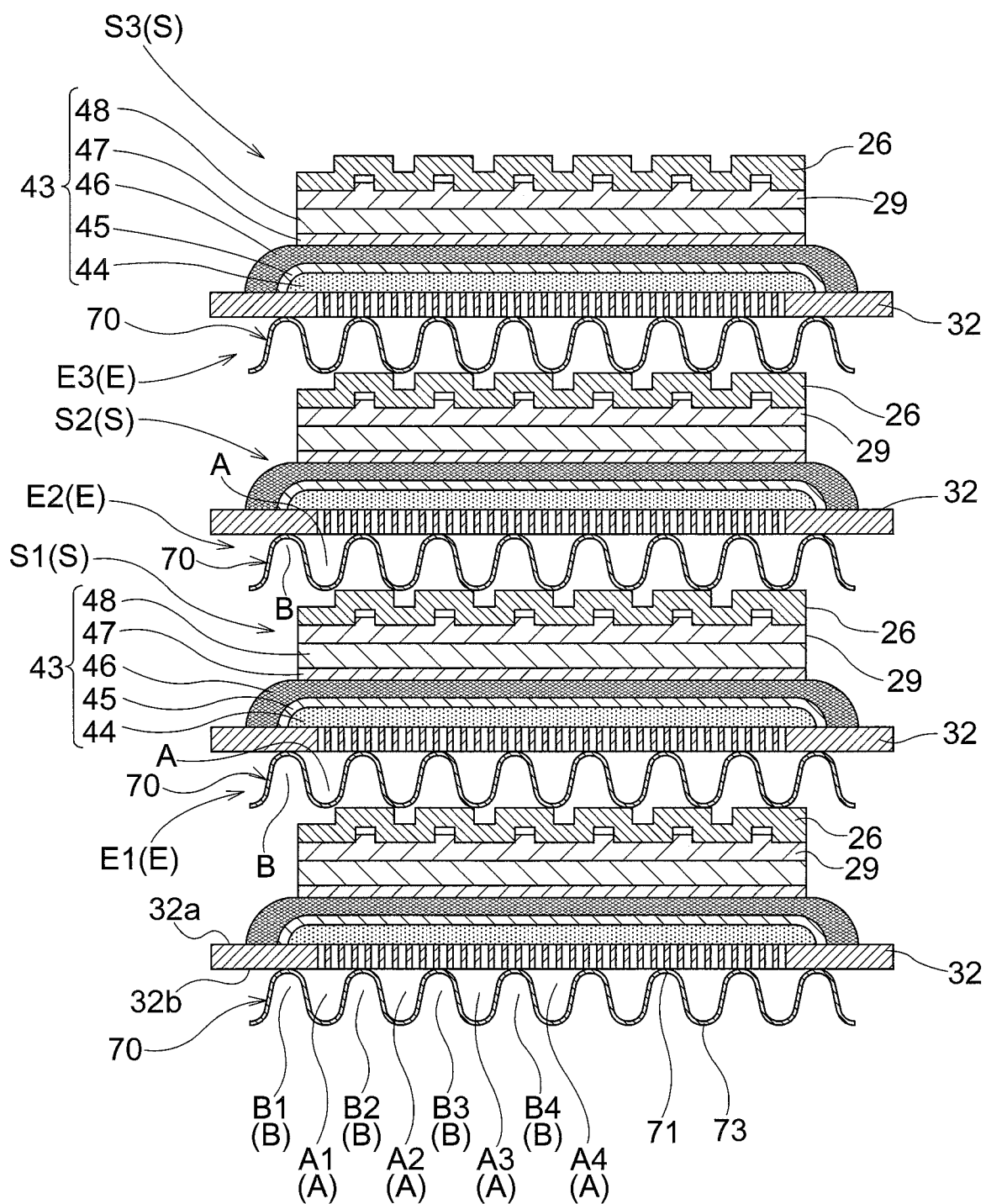
FIG. 10 is an explanatory diagram of an electrochemical module according to another embodiment.

For example, as shown in FIG. 10, a configuration is also possible in which the U-shaped member 33 of the tubular support 31 is omitted, and only the metal support 32 (second plate-like body) is provided. In one electrochemical element E1, the electrochemical reaction portion 43 is arranged on the upper face 32a of the metal support 32. The partition member 70 (first plate-like body) provided with the plurality of partitioned passages A and B is arranged on the lower face 32b of the metal support 32, and the top portions 71 of the crests of the partition member 70 are in contact with the lower face 32b of the metal support 32. The metal support (second plate-like body) 32 and the partition member (first plate-like body) 70 constitute a plate-like support.

The partitioned passages A are connected to the gas manifold 17 such that the reformed gas flows from the gas manifold 17 into the partitioned passages A. Accordingly, the reformed gas flows in the partitioned passages A from the lower end ED toward the upper end EU. The partitioned passages A are opposed to the electrode layer 44 via the metal support 32, and the reformed gas flowing in the partitioned passages A flows into the electrode layer 44 through the through holes 38 of the metal support 32. On the other hand, air flows from the blower 5 into the partitioned passages B, and the air flows from the lower end ED toward the upper end EU. In one electrochemical element E1, the adhesive 29 is used to bond the collector member 26 to a face on a side other than a side on which the metal support 32 is located, out of the front and back faces of the electrochemical reaction portion 43.

A plurality of electrochemical elements E are arranged side-by-side by bringing the collector member 26 of one electrochemical element E1 into contact with the partition member 70 of another electrochemical element E2, or joining the collector member 26 of one electrochemical element E1 to the partition member 70 of another electrochemical element E2 through welding or the like. In this case, the collector member 26 of one electrochemical element E1 is in contact with the partitioned passages B of the partition member 70 of another electrochemical element E2. The collector member 26 and the adhesive 29 have gas permeability, air flowing in the partitioned passages B of the partition member 70 of another electrochemical element E2 flows into the counter electrode layer 48 of one electrochemical element E1.

With such a configuration, the reformed gas and air flow into the electrochemical reaction portion 43, and an electrochemical reaction is caused to occur therein to generate power.

FIG. 10 shows an example in which the electrochemical element E1 is connected to another electrochemical element E2 via the collector member 26, but the collector member 26 may also be omitted. Also, in this case, air flows from the blower 5 (FIG. 1) into the partitioned passages B, and the air flows from the lower end ED toward the upper end EU.

In the description above, the top portions 71 of the crests of the partition member 70 are in contact with the lower face 32b of the metal support 32, and therefore, the plurality of partitioned passages A are formed in a state of being completely separated. However, the partitioned passages need not be completely separated as long as the partition member 70 and the metal support 32 form a closed space. For example, a configuration is also possible in which the top portion 71 of the crest at the left end portion of the partition member 70 and the top portion 71 of the crest at the right end portion of the partition member 70 are in contact with the lower face 32b of the metal support 32 and a space is thus formed, and the other crests and troughs of the partition member 70 form, in that space, a plurality of passages that are in communication with each other.

It should be noted that the partition member 70 extends in the longitudinal direction of the electrochemical element E, and thus the crests and troughs of the partition member 70 extend in the longitudinal direction of the electrochemical element E.

Figure 11:
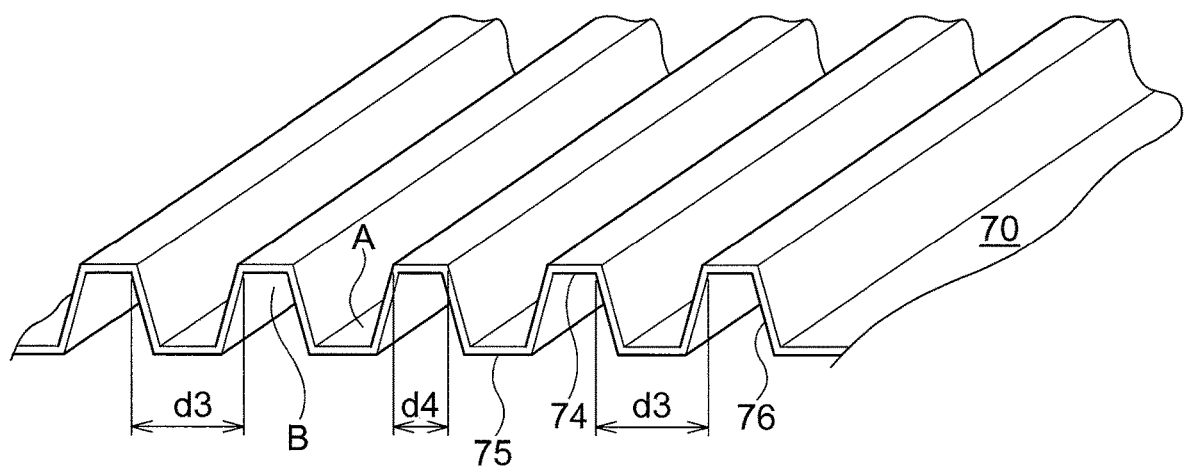
FIG. 11 is a perspective view of another partition member.

(2) In the embodiment described above, a wavelike plate is used as the partition member 70. However, the shape of the partition member 70 is not limited thereto. For example, as shown in FIG. 11, the partition member 70 may be provided with partitioned passages A with a trapezoidal cross section. In the case of the partition member 70 shown in FIG. 11, crests and troughs are alternately formed in a cross-sectional view, top faces 74 of the crests and bottom faces 75 of the troughs have a linear shape and extend in parallel with each other, and the top faces 74 of the crests and the bottom faces 75 of the troughs are connected to each other via inclined faces 76.

When such a partition member 70 is arranged in the reformed gas flowing portion 36, the top faces 74 of the crests are in contact with the lower face 32b of the metal support 32, and the bottom faces 75 of the troughs are in contact with the bottom face 33a of the U-shaped member 33 facing the reformed gas flowing portion 36. Accordingly, spaces surrounded by the lower face 32b of the metal support 32 and the partition member 70 form a plurality of partitioned passages A extending in the longitudinal direction of the tubular support 31 in the reformed gas flowing portion 36. Also, spaces surrounded by the bottom face 33a of the U-shaped member 33 and the partition member 70 form a plurality of partitioned passages B extending in the longitudinal direction of the tubular support 31 in the reformed gas flowing portion 36. As shown in FIG. 11, the partitioned passages A and the partitioned passages B are alternately formed.

For example, the width d3 of each partitioned passage A may be substantially the same as or larger than the width d4 of each partitioned passage B. It is preferable that the width d3 is large because the amount of the reformed gas flowing in the partitioned passage A can be increased, thus making it possible to improve power generation efficiency.

Figure 12:
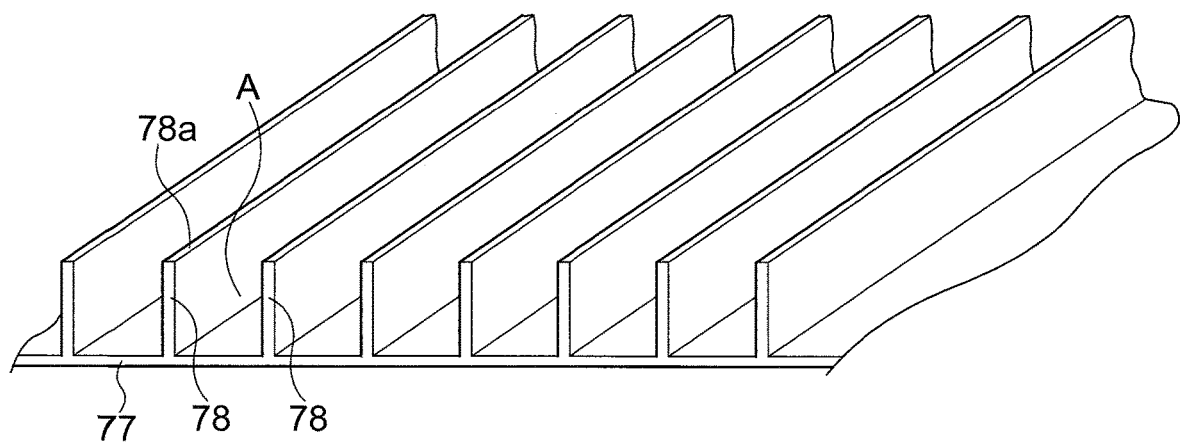
FIG. 12 is a perspective view of another partition member.

For example, as shown in FIG. 12, the partition member 70 may be provided with partitioned passages A with a cross section having a U-shape whose upper side is open. The partition member 70 shown in FIG. 12 is provided with a plurality of vertical walls 78 extending upward from a bottom wall 77 in a cross-sectional view. Each partitioned passage A is formed between the adjacent vertical walls 78. When such a partition member 70 is arranged in the reformed gas flowing portion 36, the bottom wall 77 is in contact with the bottom face 33a of the U-shaped member 33 facing the reformed gas flowing portion 36, and top portions 78a of the vertical walls 78 are in contact with the lower face 32b of the metal support 32. Accordingly, spaces surrounded by the lower face 32b of the metal support 32 and the partition member 70 form a plurality of partitioned passages A extending in the longitudinal direction of the tubular support 31 in the reformed gas flowing portion 36.

In addition, the partition member 70 may also be provided with passages with a cross section having a rectangular shape, a square shape, a triangular shape, or the like.

(3) In the embodiment described above, as shown in FIGS. 6 and 7, the top portions 71 of the crests of the partition member 70 are in contact with the lower face 32b of the metal support 32, and the bottom portions 73 of the troughs are in contact with the bottom face 33a of the U-shaped member 33 facing the reformed gas flowing portion 36. That is, all the partitioned passages A are separated from each other.

However, a gap may be formed at at least a portion between the top portions 71 of the crests of the partition member 70 and the lower face 32b of the metal support 32 as long as a flow straightening effect due to the reformed gas flowing along the plurality of partitioned passages A is ensured to some extent. In this case, although the crests and the troughs of the partition member 70 form the plurality of partitioned passages A, at least some partitioned passages A are in communication with each other through the gap, and the partitioned passages A are not completely separated from each other.

For example, in all the partitioned passages A, gaps are formed between the top portions 71 of the crests of the partition member 70 and the lower face 32b of the metal support 32. A configuration is also possible in which the top portions 71 of the crests of the partition member 70 are in contact with the lower face 32b of the metal support 32 in the partitioned passages A located at the two ends in the flow-intersection direction, and gaps are formed between the top portions 71 of the crests of the partition member 70 and the lower face 32b of the metal support 32 in the partitioned passages A other than the partitioned passages A located at the two ends.

Even in the case where the partitioned passages A are in communication with each other as in the above-mentioned configuration, due to the reformed gas flowing in the plurality of partitioned passages A in the reformed gas flowing portion 36, the reformed gas is guided along the plurality of partitioned passages A and flows. Accordingly, the amounts of gas flowing into the electrochemical reaction portions 43 are made substantially equal at multiple random positions including the central portion and the two end portions in the flow-intersection direction by a flow straightening effect due to the gas flowing in the plurality of partitioned passages A. Thus, the reaction efficiency of the electrochemical reaction in the electrochemical element E can be improved, thus making it possible to improve power generation efficiency.

(4) In the embodiment described above, the partition member 70 extends in the longitudinal direction of the tubular support 31 in substantially the same shape. However, the shape of the partition member 70 may be changed at a desired position in the longitudinal direction.

Figure 13:
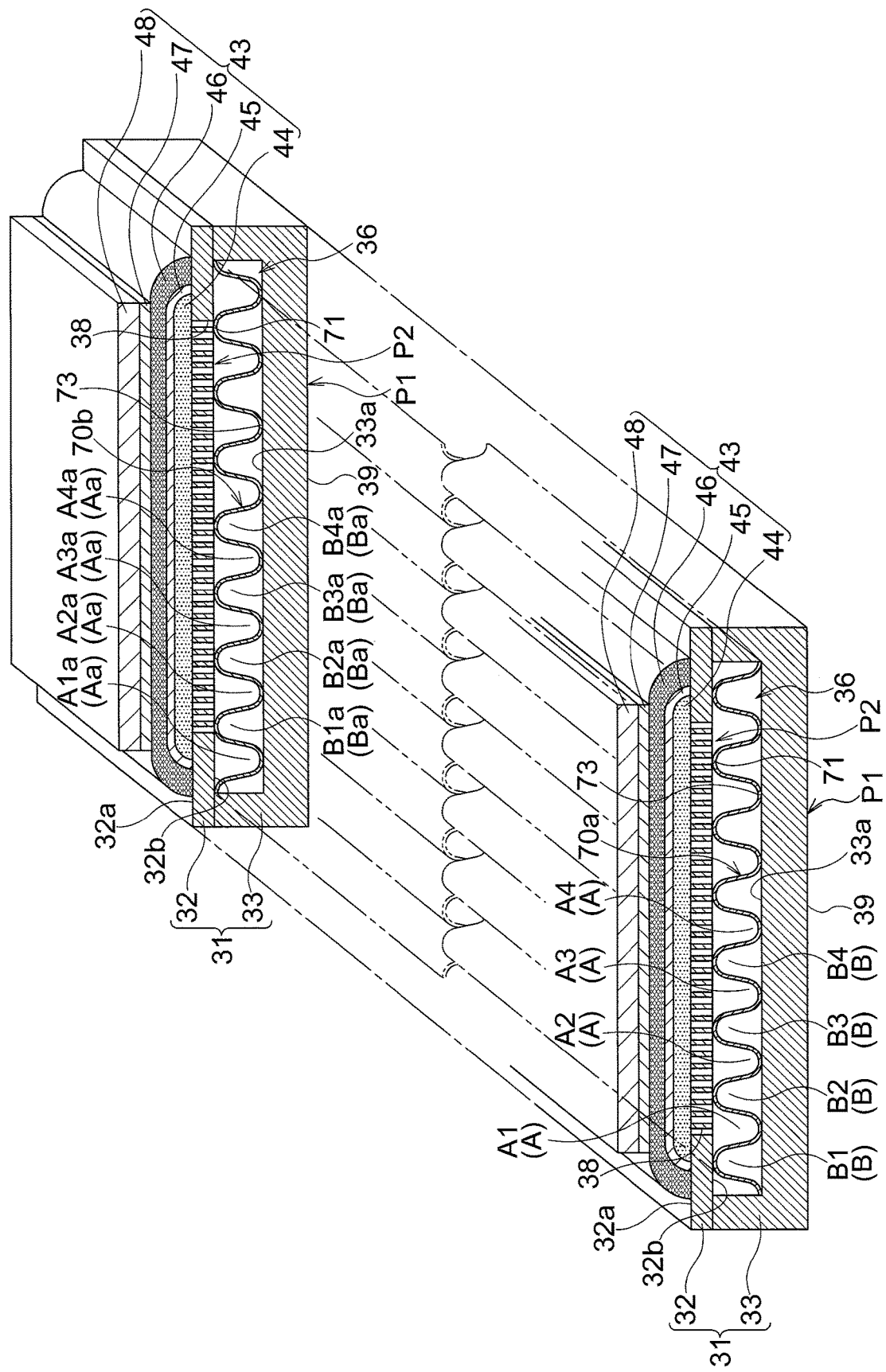
FIG. 13 is an explanatory diagram of another electrochemical module.
Figure 14:
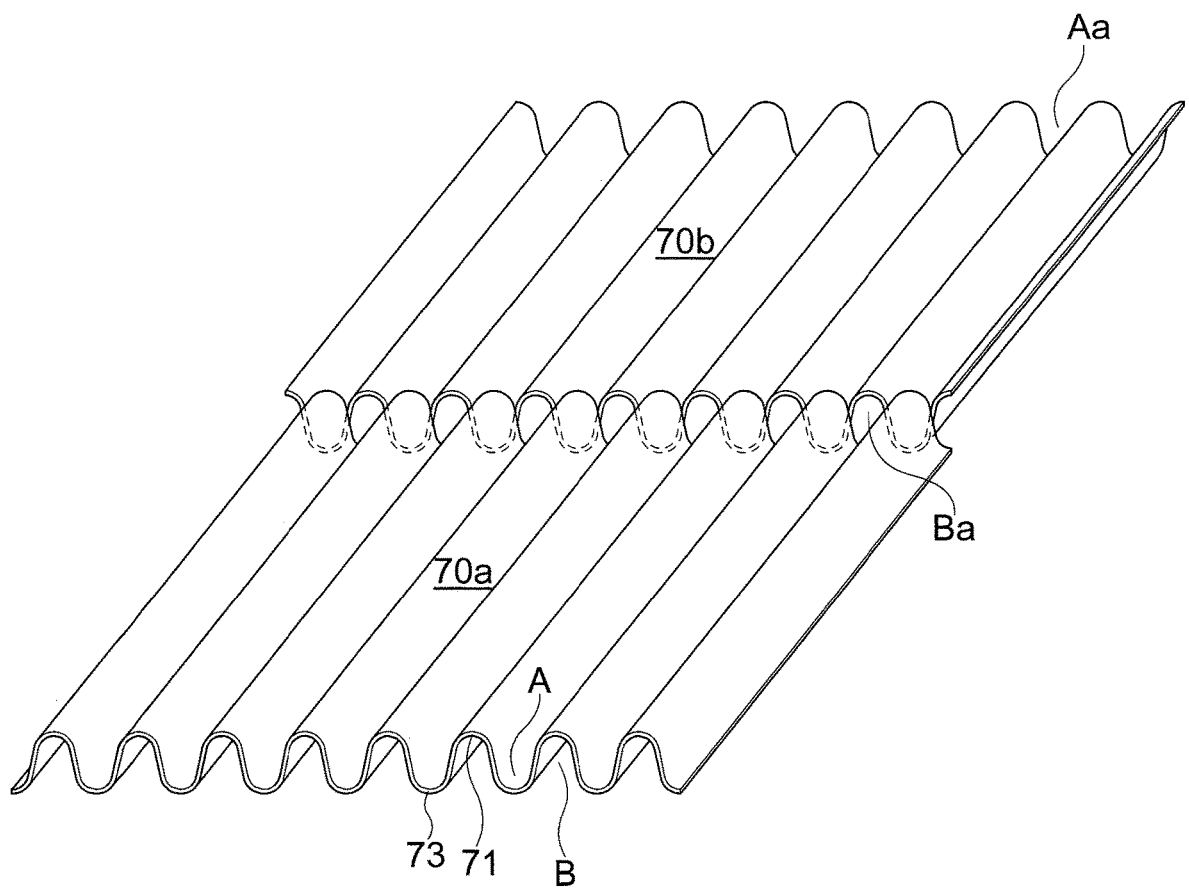
FIG. 14 is a perspective view of another partition member.

For example, in a case where the reformed gas flows into the partitioned passages A and B, as shown in FIGS. 13 and 14, the partition member 70 is formed by connecting, for example, two types of partitioned passages that are different in shape that are lined up in the longitudinal direction. In FIG. 13, a partition member 70a is located on the front side and a partition member 70b is located on the back side, and the phase of the crests and the troughs of the partition member 70a is shifted by approximately 180° from that of the other in a cross-sectional view. Accordingly, partition passages B1, B2, B3, and B4 of the partition member 70a, for example, are arranged corresponding to partition passages A1a, A2a, A3a, and A4a of the partition member 70b, for example. Thus, the reformed gas that has flowed along the partitioned passage B1 of the partition member 70a is sent to the partitioned passage A1a of the partition member 70b, and flows along the partitioned passage A1a. Similarly, the reformed gas that has flowed along the partitioned passages B2, B3, and B4 of the partition member 70a is sent to the partitioned passages A2a, A3a, and A4a of the partition member 70b, and flows along the partitioned passages A2a, A3a, and A4a.

On the other hand, partition passages A1, A2, A3, and A4 of the partition member 70a, for example, are arranged corresponding to partition passages B1a, B2a, B3a, and B4a of the partition member 70b, for example. Thus, the reformed gas that has flowed along the partitioned passages A1, A2, A3, and A4 of the partition member 70a is sent to the partitioned passages B1a, B2a, B3a, and B4a of the partition member 70b, and flows along the partitioned passages B1a, B2a, B3a, and B4a.

By configuring the partitioned passages A, B, Aa, and Ba as described above, the reformed gas flowing in the partitioned passages B of the partition member 70a that are separated from the metal support 32 is allowed to flow into the partitioned passages Aa of the partition member 70b that face the metal support 32. With this configuration, the reformed gas that flows in the partitioned passages B of the partition member 70a and is thus not capable of flowing into the electrochemical reaction portion 43 is allowed to flow into the partitioned passages Aa of the partition member 70b and is thus capable of flowing from the partitioned passages Aa to the electrochemical reaction portion 43 through the metal support 32. Accordingly, the amount of the reformed gas used in the electrode layer 44 can be increased to improve the reformed gas usage rate, thus making it possible to improve power generation efficiency. That is, in the electrode layer 44, the concentrations of the reformed gas can be appropriately adjusted at the end portion on the lower end ED side on which the reformed gas inlet 35 is located and at the end portion on the upper end EU side of the electrochemical element E on which the reaction exhaust gas outlets 37 are located, thus making it possible to prevent a decrease in the reaction efficiency due to a shortage of the reformed gas at the end portion on the side on which the reaction exhaust gas outlets 37 are located, which is the above-mentioned problem.

In the partition member 70a, reformed gas flows from the partitioned passages A into the electrochemical reaction portion 43, and therefore, the electrochemical reaction portion 43 becomes hot along the partitioned passages A. On the other hand, in the partition member 70a, the reformed gas does not flow from the partitioned passages B that do not face the electrochemical reaction portion 43, and therefore, the rise in temperature of the electrochemical reaction portion 43 along the partitioned passages B can be suppressed. Similarly, regarding the partition member 70b, the electrochemical reaction portion 43 becomes hot along the partitioned passages Aa, but the rise in temperature of the electrochemical reaction portion 43 along the partitioned passages Ba is suppressed. Accordingly, regions that become hot can be dispersed in the entire electrochemical reaction portion 43, thus making it possible to suppress deterioration of the electrochemical reaction portion 43.

It should be noted that the shape of the partition member 70 may be changed at two or more positions in the longitudinal direction. Also, in this case, in a cross-sectional view of the wavelike partition member 70, the phase of the wavelike shape of one of the adjacent wavelike portions is shifted by approximately 180° from that of the other as in the above-mentioned case.

(5) In the embodiment described above, as shown in FIG. 7, the crests and the troughs are formed such that the widths between the top portions 71 of the adjacent crests are substantially equal, but there is no limitation thereto. For example, when the flow rates of the reformed gas are different at multiple random positions in the short-side direction, the widths d1 between the top portions 71 of the crests, and the like may be changed depending on the flow rates of the reformed gas. For example, the width d1 between the top portions 71 of the crests may be increased in the partitioned passage A in which the flow rate of the reformed gas is fast.

(6) In the embodiment described above, the reformed gas flowing portion 36 of the tubular support 31 is connected to the gas manifold 17, and reformed gas flows in both the partitioned passages A and the partitioned passages B. The partitioned passages B are separated from the electrochemical reaction portion 43, and the reformed gas cannot flow into the electrochemical reaction portion 43 therefrom. Accordingly, a configuration is also possible in which only the partitioned passages A are connected to the gas manifold 17, and the reformed gas flows in only the partitioned passages A. In addition, a configuration is also possible in which the openings of the partitioned passages B are blocked such that the reformed gas does not flow into the partitioned passages B. Thus, the amount of the reformed gas that does not flow into the electrochemical reaction portion 43 and thus is not used for power generation can be reduced.

(7) In the embodiment described above, the electrochemical reaction portion 43 includes the electrode layer 44, the intermediate layer 45, the electrolyte layer 46, the reaction preventing layer 47, and the counter electrode layer 48, and these layers are formed on the metal support 32 in the stated order. However, these layers may be formed in the inverse order. For example, the electrochemical reaction portion 43 may be formed by forming the counter electrode layer 48, the reaction preventing layer 47, the electrolyte layer 46, the intermediate layer 45, and the electrode layer 44 on the metal support 32 in the stated order.

(8) In the embodiment described above, the electrochemical reaction portion 43 is formed on the surface of the tubular support 31 (the upper face 32a of the metal support 32 (second plate-like body) shown in FIG. 4). However, the electrochemical reaction portion 43 may be arranged in the reformed gas flowing portion 36 (internal passage) and formed on the face on a side other than a side on which the surface of the tubular support 31 is located.

(9) In the embodiment described above, as shown in FIG. 6 and the like, the metal support 32 is provided with the through holes 38. However, a configuration is also possible in which the U-shaped member 33 is provided with through holes instead of providing the metal support 32 with the through holes 38. In this case, for example, air is allowed to flow in the partitioned passages B in the tubular support 31, and air flowing in the partitioned passages B is allowed to flow into the counter electrode layer 48 of the adjacent electrochemical element E through the through holes provided in the U-shaped member 33.

Alternately, both the metal support 32 and the U-shaped member 33 may be provided with through holes. In this case, the reformed gas flowing in the partitioned passages A is allowed to flow into the electrode layer 44 through the through holes of the metal support 32, and air flowing in the partitioned passages B is allowed to flow into the counter electrode layer 48 of the adjacent electrochemical element E through the through holes provided in the U-shaped member 33.

(10) In the embodiment described above, the partition member 70 is constituted by a continuous wavelike plate. However, the partition member 70 need not be constituted by a continuous wavelike plate as long as the reformed gas flows as multiple flows in the reformed gas flowing portion 36 in the tubular support 31. For example, passages that extend in the longitudinal direction and are separated from each other and in which the reformed gas flows may be arranged as the partition member 70 in the reformed gas flowing portion 36.

(11) In the embodiment described above, the metal support 32 is provided with the through holes 38. However, for example, a configuration is also possible in which the metal support 32 is provided with an opening, and a gas permeable member is fitted into the opening. The metal support 32 is made of a metal or metal oxide having electrical conductivity and gas non-permeability, which is the same as the material in the above-described embodiment. The gas permeable member is made of a material having electrical conductivity and gas permeability. Examples thereof include porous metals and metal oxides. The region of the metal support 32 into which the gas permeable portion is fitted serves as the gas-permeable portion P2, and the region corresponding to a frame body that forms the opening of the metal support 32 serves as the gas flow inhibition portion P1.

(12) Using the electrochemical element E of the embodiment described above in a solid oxide fuel cell serving as an electrochemical device makes it possible to improve the reaction efficiency of the electrochemical reaction in the electrochemical element E and improve power generation efficiency. Also, using the electrochemical element E of the embodiment described above in a solid oxide electrolytic (electrolysis) cell, an oxygen sensor in which a solid oxide is used, and the like makes it possible to improve the reaction efficiency in the electrochemical element E.

(13) The embodiment above describes the configuration in which the amount of the reformed gas used in the electrode layer 44 can be increased to improve the usage rate of the reformed gas and improve the efficiency of converting chemical energy such as fuel into electric energy.

That is, in the embodiment described above, the electrochemical reaction portion 43 is operated as a fuel cell, and hydrogen gas flows into the electrode layer 44 and oxygen gas flows into the counter electrode layer 48. As a result, in the counter electrode layer 48, oxygen molecules $O_2$ react with electrons $e^-$ and oxygen ions $O^{2-}$ are produced. The oxygen ions $O^{2-}$ move to the electrode layer 44 through the electrolyte layer 46. In the electrode layer 44, hydrogen molecules $H_2$ react with the oxygen ions $O^{2-}$, and water $H_2O$ and electrons $e^-$ are produced. With these reactions, electromotive force is generated between the electrode layer 44 and the counter electrode layer 48, and power is generated.

On the other hand, in the case of operating the electrochemical reaction portion 43 as an electrolytic cell, gas containing water vapor and carbon dioxide flows to an electrode layer 44, and a voltage is applied between the electrode layer 44 and the counter electrode layer 48. As a result, in the electrode layer 44, electrons $e^-$ react with water molecules $H_2O$ and carbon dioxide molecules $CO_2$ to produce hydrogen molecules $H_2$, and carbon monoxide CO and oxygen ions $O^{2-}$. The oxygen ions $O^{2-}$ move to the counter electrode layer 48 through the electrolyte layer 46. In the counter electrode layer 48, the oxygen ions $O^{2-}$ release electrons and oxygen molecules $O_2$ are produced. With the reactions above, water molecules $H_2O$ are electrolyzed into hydrogen $H_2$ and oxygen $O_2$, and in the case where gas containing carbon dioxide molecules $CO_2$ flows, carbon dioxide molecules $CO_2$ are electrolyzed into carbon monoxide CO and oxygen $O_2$.

In the case where gas containing water vapor and carbon dioxide molecules $CO_2$ flows, a fuel converter that synthesizes various compounds such as hydrocarbons from hydrogen, carbon monoxide, and the like generated through the above-mentioned electrolysis in the electrochemical reaction portion 43 can be provided. With the fuel supply unit, hydrocarbon and the like produced by this fuel converter can flow to the electrochemical reaction portions 43 or can be extracted from the system and the device and separately used as fuel or a raw chemical material.

Figure 17:
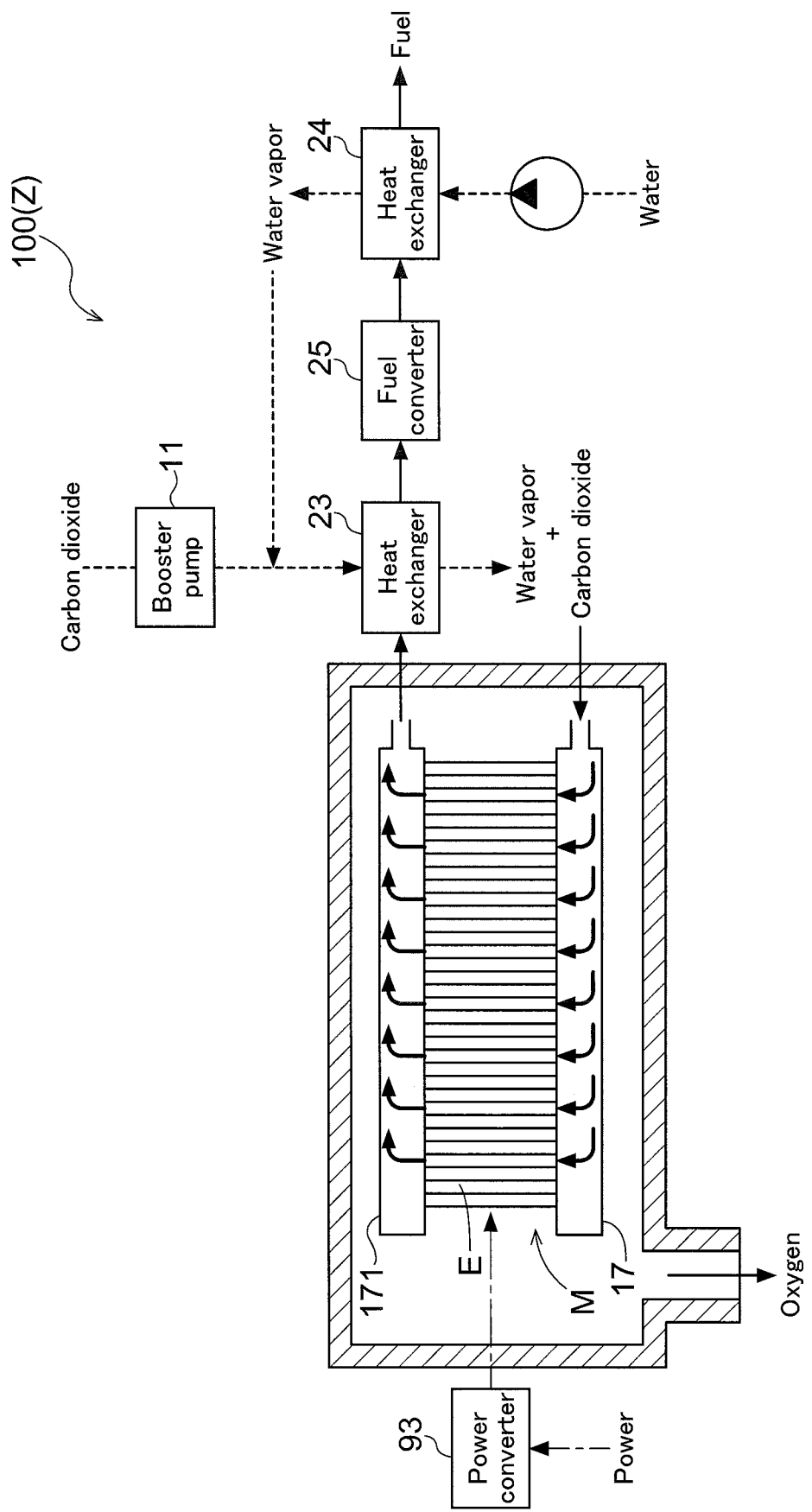
FIG. 17 is a schematic view showing an overall configuration of another energy system.

In an energy system Z shown in FIG. 17, an electrochemical module M (a portion of the electrochemical device 100) includes a plurality of electrochemical elements E, a gas manifold 17, and a gas manifold 171. The electrochemical elements E are arranged side-by-side and electrically connected to each other, and one end portion (lower end portion) of each of the electrochemical elements E is fixed to the gas manifold 17 and the other end portion (upper end portion) thereof is fixed to the gas manifold 171. At one end portion (lower end portion) of the electrochemical element E, water vapor and carbon dioxide are supplied to either or both of a plurality of partitioned passages A and a plurality of partitioned passages B. The above-described reactions occur in the electrochemical reaction portion 43 of the electrochemical element E. Hydrogen, carbon monoxide, and the like produced in the electrochemical reaction portion 43 can be efficiently collected using the gas manifold 171 that is collectively in communication with the other end portions (upper end portions) of either or both of the plurality of partitioned passages A and the plurality of partitioned passages B and provided at the outlets thereof.

By employing the configuration in which a heat exchanger 24 shown in FIG. 17 is operated as a waste heat utilization system that performs heat exchange between the water and the reaction heat produced by the reaction in a fuel converter 25 to vaporize the water, and a heat exchanger 23 shown in FIG. 17 is operated as a waste heat utilization system that performs heat exchange between water vapor and carbon dioxide, and waste heat produced by the electrochemical elements E to preheat the water vapor and the carbon dioxide, the energy efficiency can be improved.

Moreover, a power converter 93 supplies power to the electrochemical elements E. Accordingly, as mentioned above, the electrochemical elements E function as electrolytic cells.

Therefore, with the above-mentioned configuration, an electrochemical device 100, an energy system Z, and the like that can improve the efficiency of converting electric energy into chemical energy such as fuel can be provided.

Figure 15:
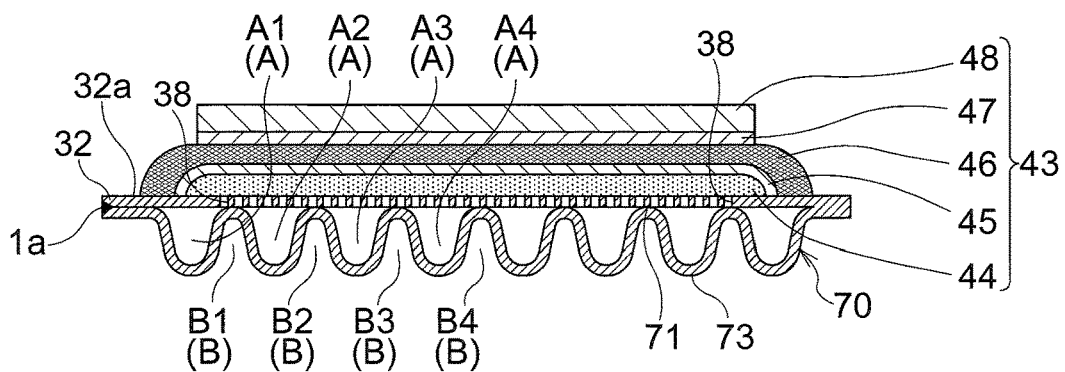
FIG. 15 is an explanatory diagram of an electrochemical module according to another embodiment.

(14) In FIG. 10 described above, the plate-like support includes the metal support (second plate-like body) 32 and the partition member (first plate-like body) 70. Separate plate-like bodies may be used to form the metal support (second plate-like body) 32 and the partition member (first plate-like body) 70, or a single plate-like body as shown in FIG. 15 may be used. In the case shown in FIG. 15, the metal support 32 and the partition member 70 are stacked by folding a single plate-like body. The metal support 32 and the partition member 70 are integrated by, for example, welding peripheral portions 1a. It should be noted that a continuous seamless plate-like body may be used to form the metal support 32 and the partition member 70 and may be folded to be shaped as shown in FIG. 15.

Moreover, as described later, the partition member 70 serving as the first plate-like body may be constituted by a single member or two or more members. Similarly, the metal support 32 serving as the second plate-like body may be constituted by a single member or two or more members.

Moreover, in FIG. 4, the tubular support 31 (plate-like support) includes the U-shaped member (first plate-like body) 33 and the metal support 32 (second plate-like body). The reformed gas flowing portion (internal passage) 36 is provided with the partition member (first plate-like body, multiple-passage formation member) 70 for partitioning the reformed gas flowing portion 36 into the plurality of partitioned passages A. Separate plate-like bodies may be used to form the U-shaped member 33 (first plate-like body) and the metal support 32 (second plate-like body), or a single plate-like body or a continuous plate-like body as described above may be used. Furthermore, a single plate-like body or a continuous plate-like body as described above may be used to form the U-shaped member 33 (first plate-like body), the metal support 32 (second plate-like body), and the partition member (first plate-like body, multiple-passage formation member) 70.

Moreover, the U-shaped member 33 serving as the first plate-like body may be constituted by a single member or two or more members. As described later, the partition member 70 serving as the first plate-like body may be constituted by a single member or two or more members. Furthermore, the metal support 32 serving as the second plate-like body may be constituted by a single member or two or more members.

(15) The above-mentioned partition member 70 partitions the reformed gas flowing portion 36 into the plurality of partitioned passages A. The partition member 70 extends in the longitudinal direction between the lower end ED and the upper end EU of the electrochemical element E, namely the reformed gas flowing direction. The partition member 70 may be formed of a continuous wavelike plate-like body or two or more wavelike plate-like bodies between the lower end ED and the upper end EU. For example, the partition member 70 may be formed of two or more wavelike plate-like bodies that are separate from each other in a direction extending in the longitudinal direction, or two or more wavelike plate-like bodies that are separate from each other in a direction extending in the short direction.

As shown in FIG. 7, the partition member 70 is formed in a wavelike shape by repeatedly forming crests and troughs with the same shape. However, the partition member 70 may include a plate-like portion. For example, the partition member 70 may be formed by forming plate-like portions and protruding portions alternately. The protruding portions can be used as portions in which a fluid such as the reformed gas flows.

(16) The partition member 70 need not be formed in a wavelike shape as a whole, and it is sufficient that at least a portion thereof is formed in a wavelike shape. For example, the partition member 70 may be formed such that a portion in the longitudinal direction has a flat shape and the portion other than the flat portion has a wavelike shape, between the lower end ED and the upper end EU. The partition member 70 may also be formed such that a portion in the short direction has a flat shape and the portion other than the flat portion has a wavelike shape.

Figure 16:
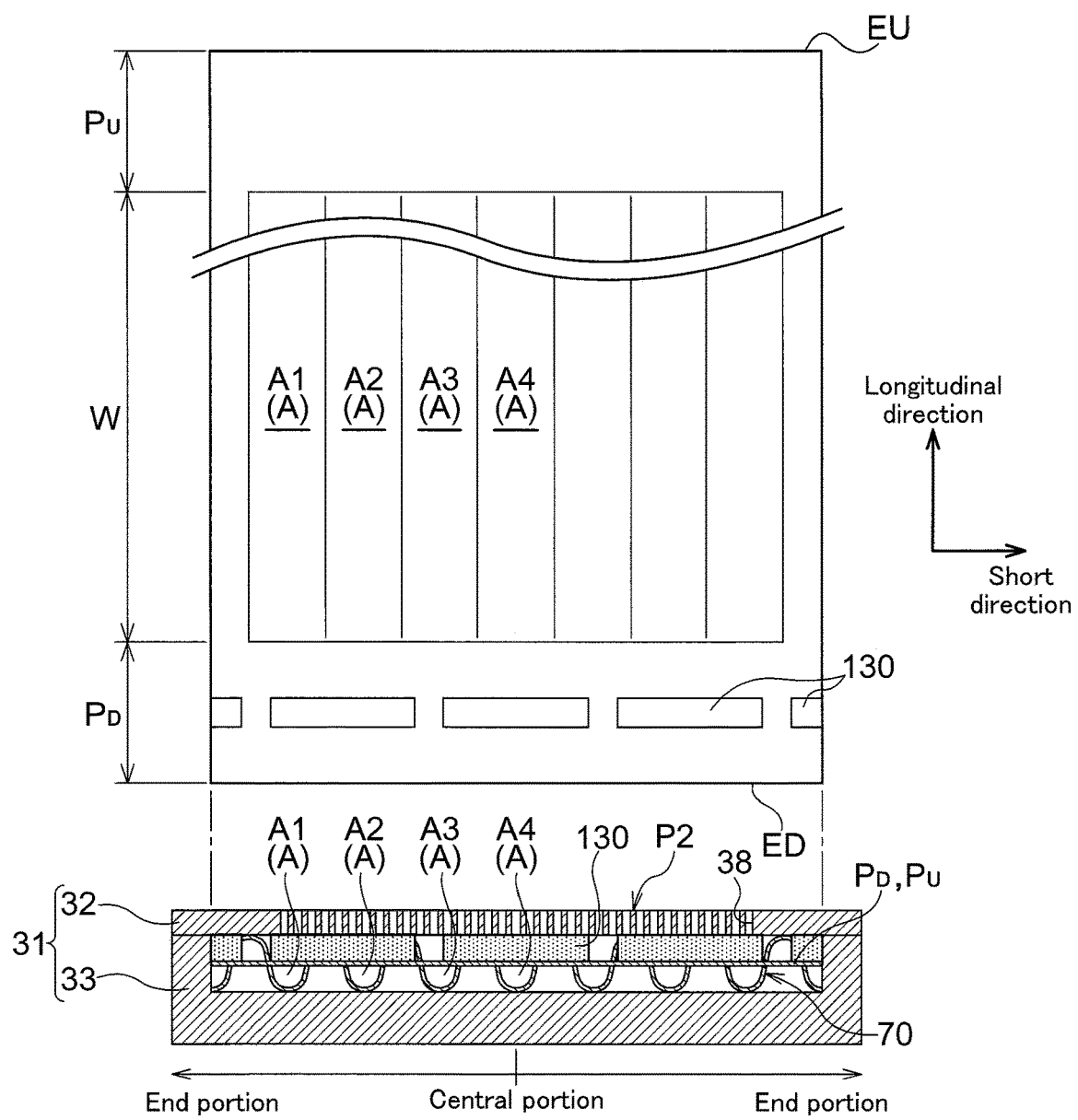
FIG. 16 is an explanatory diagram of another partition member.

A partition member 70 shown in FIG. 16 is formed such that a portion thereof has a wavelike shape, and the portion other than the wavelike portion has a flat shape. As shown in FIG. 16, a flat portion PD is provided on the lower end ED side in the longitudinal direction, and a flat portion PU is provided on the upper end EU side in the longitudinal direction. The partition member 70 shown in FIG. 16 is provided with a wavelike portion W between the flat portion PD and the flat portion PU. The wavelike portion W partitions the reformed gas flowing portion 36 into a plurality of partitioned passages A.

In the partition member 70 shown in FIG. 16, the flat portion PD on the lower end ED side is provided with at least one structure 130 protruding from the flat portion PD. In FIG. 16, a plurality of structures 130 are provided. A portion between the adjacent structures 130 has a recessed shape and serves as a recessed passage through which the reformed gas can pass. Accordingly, the protruding structures 130 function as barriers for inhibiting the flow of the reformed gas, and pressure loss occurs in the flow of the reformed gas. In the state in which pressure loss occurs due to the structures 130, the reformed gas passes through the recessed passages between the structures 130.

With the structures 130 having such a configuration, the reformed gas introduced into the flat portion PD is substantially uniformly supplied from the flat portion PD to the plurality of partitioned passages A while being temporarily stored on the flat portion PD. Thus, the distribution of the reformed gas flowing in the partitioned passages, namely the flow rates, the flow amounts, the pressures, and the like, are made substantially equal among the partitioned passages A. Accordingly, in the electrochemical reaction portion, a difference between a portion that is deficient in the reformed gas and a portion in which an excessive amount of the reformed gas flows can be reduced, and an electrochemical reaction can be caused to occur in the overall electrochemical element, thus making it possible to improve the usage rate of the reformed gas and improve the reaction efficiency in the electrochemical element.

It should be noted that the structures 130 can also be provided on the flat portion PU on the upper end EU side.

(17) FIGS. 4, 6, 8, 10, and 15 show the example in which the metal support 32 and the partition member 70 are in contact with each other at a plurality of points and the plurality of partitioned passages A are completely separated from each other. However, the configuration in which the metal support 32 and the partition member 70 are in contact with each other at a plurality of points and a plurality of passages are completely separated from each other need not be necessarily employed as long as the flow straightening effect with which the flow rates of gas flowing in the passages are made substantially equal at multiple random positions in the flow-intersection direction can be obtained.

Figure 9:
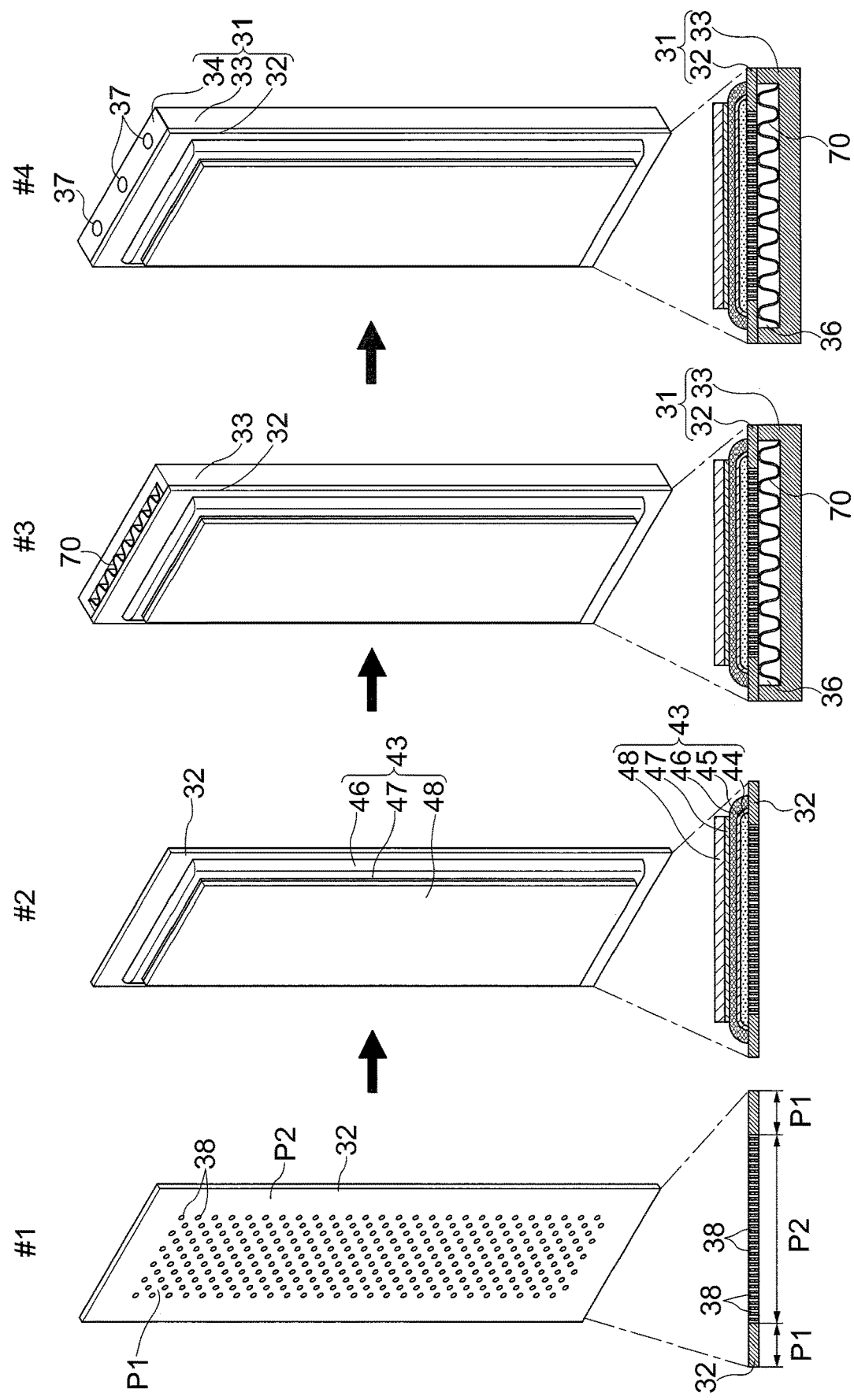
FIG. 9 is an explanatory diagram of a manufacturing process of an electrochemical element.

(18) In the above-mentioned gas-permeable portion P2, at least a portion of the metal support 32 (second plate-like body) of the tubular support 31 (plate-like support) is provided with the plurality of through holes 38 that pass through the metal support 32 in the thickness direction and are arranged in a matrix (FIG. 9 and the like).

Unlike this configuration, the gas-permeable portion P2 may have a configuration in which independent holes extending in a direction that is substantially orthogonal to the thickness direction are formed instead of the above-mentioned through holes 38 that pass through the metal support 32 in the thickness direction. Each of the independent holes passes through the metal support 32 in the thickness direction at at least one position in the extending direction. For example, the independent holes correspond to the partitioned passages A and extend in the direction that is substantially orthogonal to the thickness direction. In addition, each of the independent holes passes through the metal support 32 at at least one position in the extending direction and is in communication with the corresponding partitioned passage A. Each of the independent holes is not in communication with the adjacent independent hole.

Moreover, the gas-permeable portion P2 may have a configuration in which at least a partial region of the metal support 32 is provided with a three-dimensional (mesh-like) continuous hole instead of the plurality of through holes 38. For example, the continuous hole is formed due to pores of a porous metal support 32 being continuously coupled. The continuous hole passes through the metal support 32 at at least one position of the continuous hole.

(19) FIG. 2 shows a case where the gas manifold 17 is provided at the inlets through which gas flows into the passages. However, a gas manifold may be provided at the outlets through which gas flows from the passages. In this case, gas discharged or produced through the electrochemical reaction can be efficiently collected.

(20) In the embodiment described above, the electrochemical device includes the electrochemical module M including a plurality of electrochemical elements. However, a configuration in which a single electrochemical element is included can be applied to the electrochemical device of the embodiment described above.

The configuration disclosed in the embodiment described above (including the other embodiments; the same applies to the following) can be applied in combination with configurations disclosed in the other embodiments as long as no contradiction arises. Also, the embodiments disclosed in this specification are illustrative, embodiments of the present invention are not limited to the disclosed embodiments, and appropriate modifications can be made without departing from the object of the present invention.

DESCRIPTION OF REFERENCE SIGNS

17: Gas manifold
31: Tubular support
32: Metal support
32a: Upper face
32b: Lower face
33: U-shaped member
36: Reformed gas flowing portion
38: Through hole
43: Electrochemical reaction portion
44: Electrode layer
45: Intermediate layer
46: Electrolyte layer
47: Reaction preventing layer
48: Counter electrode layer
70: Partition member
A: Partitioned passage
B: Partitioned passage
E: Electrochemical element
E3: Electrochemical element
ED: Lower end
EU: Upper end
Ea: Lower end
P1: Gas flow inhibition portion
P2: Gas-permeable portion

The invention claimed is:
1. An electrochemical element comprising:
a conductive plate-like support provided with an internal passage therein,
wherein the plate-like support includes, in at least a portion of the plate-like support:
a gas-permeable portion through which gas is permeable between the internal passage, which is located inside the plate-like support, and the outside;
an electrochemical reaction portion that entirely or partially covers the gas-permeable portion and includes at least a film-like electrode layer, a film-like electrolyte layer, and a film-like counter electrode layer in the stated order;
wherein the plate-like support is provided with a plurality of passages in the internal passage, through which passages, gas flows in the same direction, and
wherein the plate-like support further includes:
an internal passage formation member that forms the internal passage; and
a multiple-passage formation member that is housed in the internal passage and forms the plurality of passages, wherein the multiple-passage formation member is divided in a longitudinal direction so that a shape of the multiple-passage formation member changes at a desired position in the longitudinal direction.
2. The electrochemical element according to claim 1, wherein the plate-like support includes a first plate-like body that forms the plurality of passages in the internal passage, and a second plate-like body.

3. The electrochemical element according to claim 1, wherein at least a portion of the plate-like support has a wavelike shape.

4. The electrochemical element according to claim 1, wherein at least a portion of the multiple-passage formation member has a wavelike shape.

5. The electrochemical element according to claim 1, wherein the plate-like support includes at least a first plate-like body and a second plate-like body, and wherein contact portions where the first plate-like body is in contact with the second plate-like body and non-contact portions where the first plate-like body is not in contact with the second plate-like body form the plurality of passages in the internal passage.

6. The electrochemical element according to claim 1, wherein the plate-like support is formed in a plate shape that extends in a longitudinal direction, and wherein the plurality of passages extend in the longitudinal direction.

7. The electrochemical element according to claim 1, wherein the gas-permeable portion is a hole region provided with a plurality of through holes that pass through at least a portion of the plate-like support.

8. The electrochemical element according to claim 1, wherein the plate-like support includes at least a first plate-like body and a second plate-like body, and wherein the first plate-like body is formed in one piece or as a continuous one constituted by separately formed portions, along a plate-like face of the first plate-like body.

9. The electrochemical element according to claim 1, further comprising a manifold that is collectively in communication with the plurality of passages and through which the gas flows.

10. An electrochemical module comprising a plurality of electrochemical elements according to claim 1, wherein the plurality of electrochemical elements are arranged side by side in a state in which one electrochemical element is electrically connected to another electrochemical element, and the plate-like supports are opposed to each other.

11. An electrochemical device comprising at least an electrochemical element according to claim 1 and a fuel converter, wherein gas containing a reducing component flows between the electrochemical element and the fuel converter.

12. An electrochemical device comprising at least an electrochemical element according to claim 1 and an inverter that extracts power from the electrochemical element.

13. An electrochemical device comprising an electrochemical element according to claim 1, a fuel converter, and a power converter that extracts power from the electrochemical element.

14. An electrochemical device comprising a fuel supply unit that allows a reducing component gas to flow from a fuel converter to an electrochemical element according to claim 1, or from the electrochemical element to the fuel converter.

15. An energy system comprising:
the electrochemical device according to claim 11; and
a waste heat utilization system that reuses heat discharged from the electrochemical device or a fuel converter.

16. An electrochemical device comprising an electrochemical module according to claim 10 and a fuel converter, wherein gas containing a reducing component flows between the electrochemical module and the fuel converter.

17. An electrochemical device comprising an electrochemical module according to claim 10 and an inverter that extracts power from the electrochemical module.

18. An electrochemical device comprising an electrochemical module according to claim 10, a fuel converter, and a power converter that extracts power from the electrochemical module, or supplies power to the electrochemical module.

19. An electrochemical device comprising a fuel supply unit that allows a reducing component gas to flow from a fuel converter to an electrochemical module according to claim 10, or from the electrochemical module to the fuel converter.

* * * * *